3,047,594
PREPARATION OF 21-METHYL STEROIDS AND INTERMEDIATES

Hans-Jurgen E. Hess, Groton, George M. K. Hughes, Gales Ferry, and Gerald D. Laubach, Niantic, Conn., assignors to Chas. Pfizer & Co., Inc., New York, N.Y., a corporation of Delaware
No Drawing. Filed May 11, 1960, Ser. No. 28,185
20 Claims. (Cl. 260—397.45)

This application is concerned with a new and useful synthetic process. More particularly, it is concerned with a procedure for the preparation of 9α-fluoro-21-methyl-Δ⁴-pregnene-11β,17α,21-diol-3,20-dione 21-acylate and like compounds. These compounds are described and claimed in copending patent application, Serial No. 3,996, filed January 22, 1960. It is concerned also with valuable intermediates prepared and used in the synthesis.

The essence of this invention is the discovery that useful compounds can be prepared by applying known reactions to a variety of known and unknown intermediates in a highly selective manner. One aspect of this invention is set forth below in a synthetic sequence which shows the application of the process of this invention to the preparation of 6α,9α-difluoro-21-methyl-Δ¹,⁴-pregnadiene-11β,17α,21-diol-3,20-dione 21-acetate, a compound claimed in the aforesaid patent application.

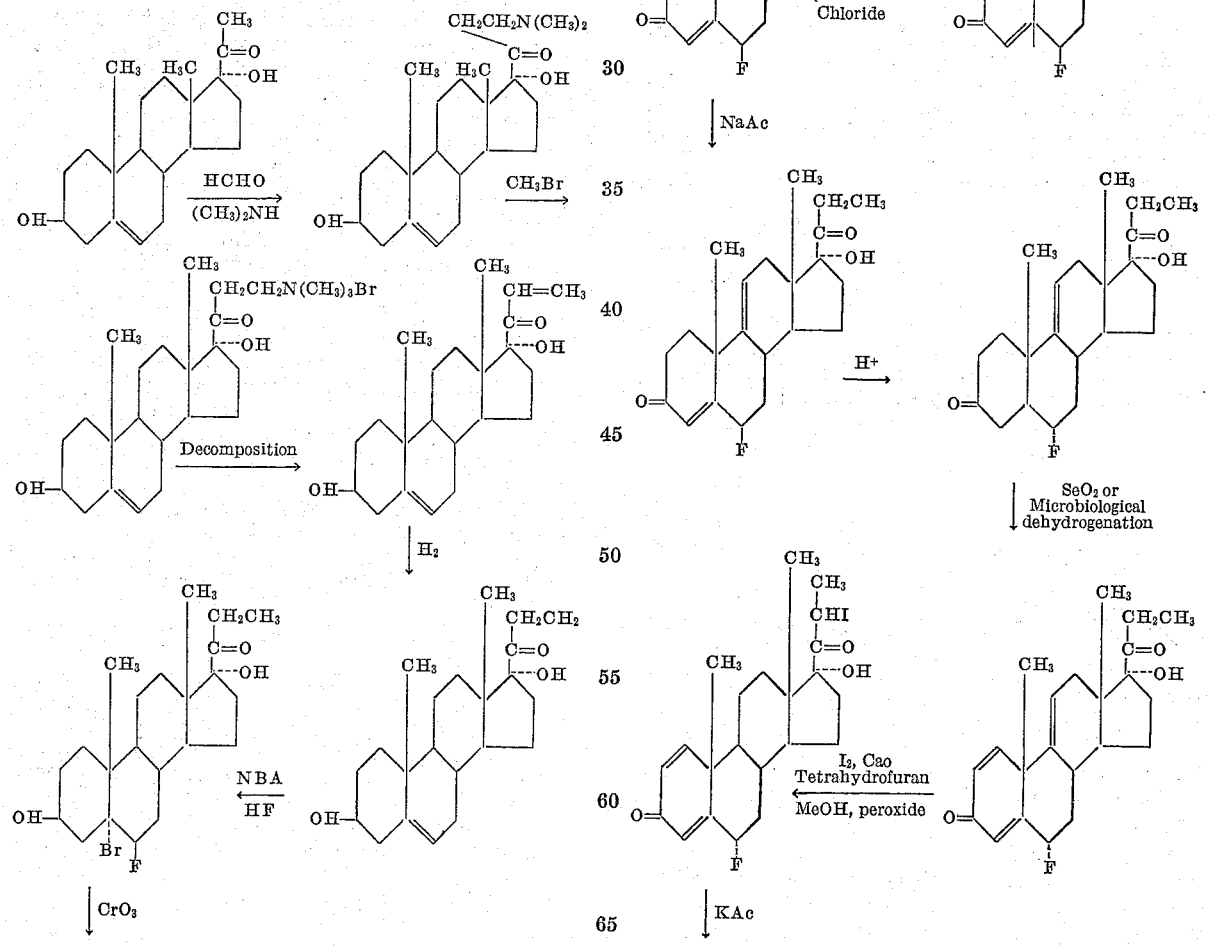

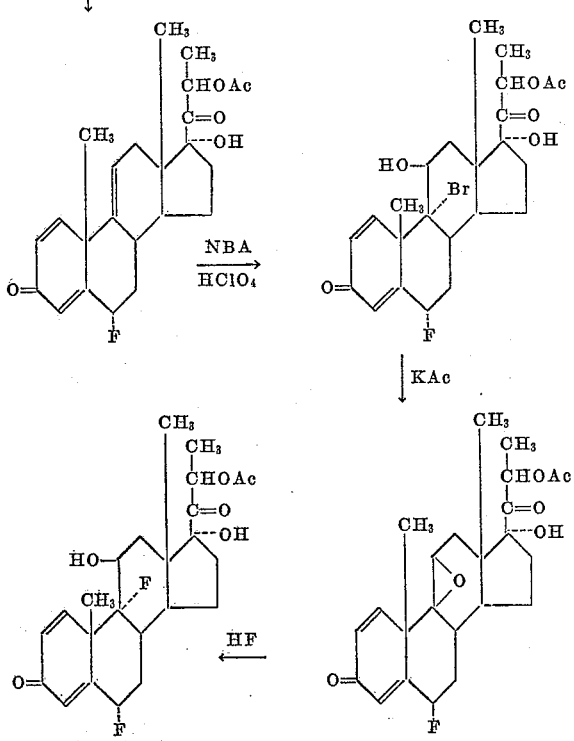

It should be noted that the compound, 9α-bromo-21-methyl-Δ$^{1,4}$-pregnadiene-11β,17α,21-triol-3,20-dione 21-acetate which is adrenocortically active is also claimed in the said patent application although it is prepared by another method. None of the other compounds in the foregoing sequence manifest therapeutic activity associated with the adrenocortical hormones.

The foregoing sequence shows the preparation of 6α,9α-difluoro-21-methyl-Δ$^{1,4}$-pregnadiene-11β,17α,21-diol-3,20-dione 21-acetate. This compound and the corresponding 6-desfluoro as well as the two 1,2-dihydro compounds all of which can be prepared by the process of this invention are especially important modifications of the 21-methyl compounds claimed in the hereinbefore cited patent application, since they have a high order of adrenocortical activity, coupled with a minimum of salt retention. The 1,2-dihydro compounds are prepared by simply omitting the dehydrogenation step. The 6-desfluoro compounds are prepared by omitting the fluorination step.

Compounds prepared using the process of this invention may be represented by the formulas:

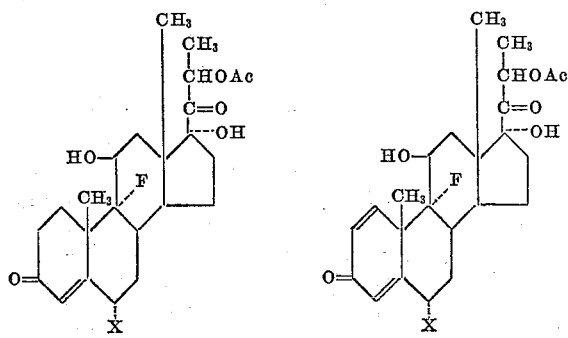

wherein Ac is an acyl hydrocarbon containing up to five carbon atoms and X is hydrogen or fluorine.

In the first step of this invention, the known compound, Δ$^5$-pregnene-17α-ol-20-one is converted to 21-dialkylaminomethyl-Δ$^5$-pregnene-17α-ol-20-one by treatment with an amine acid addition salt and formaldehyde. The amine salt may be symmetrical or non-symmetrical, cyclic or non-cyclic. Preferably, it is a lower alkyl amine salt containing up to four carbon atoms in each alkyl group. These latter are generally preferred since they are readily available at a reasonable price. Preferred amine salts include, for example, diethyl amine sulfate, methyl ethyl amine sulfate, di-n-butyl amine hydrobromide and ethyl isopropyl amine hydriodide. Hydrochloride salts are generally preferred and of these, dimethyl amine hydrochloride is the most desirable since it is most readily available and gives good yields. Further, it is sometimes desirable to add small amounts of acid before or during the reaction so as to maintain the pH of the reaction mixture at from about 2.5 to about 5.0. This is most conveniently accomplished with hydrochloric acid.

In carrying out the reaction, the reactants are mixed together in the selected solvent and maintained at a temperature of from about 90° C. to about 140° C. for from about two to about twenty-four hours. The preferred solvents for the reaction are alkanols containing up to five carbon atoms, although other lower aliphatic oxygenated solvents can be used. The preferred alkanols are n-propanol and n-butanol since they reflux at atmospheric pressure within the preferred temperature range. Obviously, however, higher boiling solvents can be used, although usually not at the reflux temperature. Similarly, lower boiling solvents such as methyl and ethyl alcohol are useful if the reaction is carried out under pressure. It is generally most convenient to employ an excess of the paraldehyde and amine salt, to insure as complete a reaction as possible of the more expensive pregnene derivatives. A molar excess of from about 50% to about 600% or even more than be used. The amount is not critical.

The reaction will often be carried out in an inert atmosphere, for example, a nitrogen atmosphere so as to minimize loss of reaction product by side reactions. This, however, is not necessary.

At the end of the reaction period, the desired product may be isolated by evaporating the solvent, preferably in vacuo, purified by triturating with hot dilute hydrochloric acid followed in the case of compounds forming soluble hydrochlorides with hot water. The water and dilute acid solutions are combined and made basic with dilute aqueous alkali, for example, 10% sodium carbonate, bicarbonate or similar reagent. Occasionally, the pure product will precipitate from the basic solution and may be recovered by filtration. If it does not precipitate, it may be extracted with a water immiscible lower hydrocarbon or halogenated hydrocarbon solvent such as ethylene chloride, chloroform, carbon tetrachloride, chlorobenzene, hexane or octane. The desired product is then recovered from the organic solvent by evaporation in vacuo. The extraction step may also be employed with those products which precipitate from the alkaline solution and thus increase the overall yield.

In the case of compounds forming insoluble hydrochlorides, the residue from the trituration step is recovered by filtration and extracted with an organic solvent such as chloroform which dissolves the impurities. The hydrochloride is recovered by filtration and may be converted to the free base by treatment with dilute aqueous alkali as described above.

The amine prepared as described above is next converted to a quaternary ammonium halide using procedures generally employed for this purpose. Thus, for example, the amine is mixed in a lower alkanol solvent, e.g. methanol or ethanol with an alkyl halide containing up to four carbon atoms and simply allowed to stand for from about six to about sixteen hours at from about 20° C. to about 30° C. Usually an excess of as much as fifty percent or more of alkyl halide will be used, but this is not essential. The solvent is removed, for example, by evaporation in vacuo and the product recovered as a residue. It may be purified by trituration with ether, acetone or other similar solvent. Methanol and ethanol are the preferred solvents for the reaction because of their good solubility characteristics and also because they can be readily evaporated due to their low boiling point.

The preferred alkyl halides are methyl or ethyl bromide. These are preferred because they are the easiest to obtain and because at the temperatures used, they are liquids. Other alkyl halides such as methyl or ethyl chloride can be used but they are usually less convenient since they are gases at ordinary temperature and pressure. Butyl bromide, methyl iodide, or isopropyl chloride may be employed. The iodides are generally not preferred because they form insoluble precipitates when the quaternary compound is decomposed to form the propenoyl compounds in accordance with the equations shown below. They can be used, however, and the product purified by repeated recrystallizations or by standard chromatographic procedures.

The quarternary compound thus prepared is converted to a 17β-propylene compound. This is accomplished by reaction with water or aqueous alkali for from about one to about six hours at a temperature of from about 20° C. to about 30° C. Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

Although the desired products form by simple reaction with water, they form more readily and often in higher yields if the reaction is carried out at an alkaline pH of from 7.5 to about 12. The desired alkalinity may be effected by adding a small amount of aqueous solutions containing from about 2% to about 10% by weight of an alkali or alkaline earth metal hydroxide, oxide, carbonate, bicarbonate or alkali metal acetate, tartrates or citrates.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours.

The aqueous solution may contain a small amount of tert-butanol to enhance solubility.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene and benzene. It is, of course, possible to use an extraction procedure whether or not the product precipitates and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances and in any other instances where there is co-precipitation of the main product and by-product, it is always preferred to use an extraction step.

The propenoyl compounds are isolated from the organic solvent by removal of the solvent in vacuo, preferably after drying the solvent using an anhydrous drying agent such as sodium or magnesium sulfate. The product may be further purified by recrystallization from a suitable solvent such as methyl alcohol.

It is also possible to prepare the propenoyl compound directly from the amine. Thus, the amine acid addition salt may be taken up in ethanol, the quarternizing agent together with a small amount of a basic reagent such as potassium acetate, is added and the mixture is refluxed for approximately five hours. The product is isolated by removal of most of the solvent and precipitation with water.

In the next step of this process, the propenoyl group at the 17β-position is reduced to a propanoyl group with hydrogen in the presence of a catalyst. In carrying out the reduction process, i.e., the hydrogenation process, it is preferred to employ temperatures of from about 15° C. to about 35° C. although somewhat higher temperatures are not deleterious. Hydrogen pressures at from slightly below atmospheric to about 10 atmospheres may be employed. Generally speaking, room temperature and atmospheric pressure are simplest and are fully satisfactory. The reduction should be terminated when the theoretical amount of hydrogen has been adsorbed. This can be readily determined by observing the change in pressure of the hydrogen. At atmospheric pressure using laboratory quantities of reactants, the theoretical amount of hydrogen is generally consumed in less than an hour. For commerical operations, the duration of the reaction may be somewhat increased. The time of the reaction is not critical.

The products of the reaction may be isolated with relative ease; preferably, the catalyst is filtered and the solvent removed in vacuo. Often, the desired product is obtained in sufficient purity for the next reaction by simply removing the solvent. In other cases, it may be desirable to subject the material to conventional purification procedures such as recrystallization or chromatography.

The preferred catalyst for the reaction is palladium and this may be used with or without a carrier. Especially useful catalysts include 10% palladium on carbon or palladium on calcium carbonate. The proportion of catalyst to reactants is not critical and may vary widely. Between about 10% and about 500% by weight of the steroid is satisfactory and between 50% and 100% is preferred.

The hydrogenation should be conducted in a liquid system. The choice of solvent is not critcial. Suitable solvents include lower aliphatic oxygenated solvents containing up to five carbon atoms such as alkanols, esters or ketones including methanol, ethanol, ethyl acetate, propyl acetate, acetone, and methyl isopropyl ketone.

If a 6-fluoro compound is to be prepared, the 17β-propanoyl compound thus obtained is next converted to a 5α-bromo-6β-fluoro compound. This is accomplished by reaction with N-bromoacetamide in the presence of anhydrous hydrogen fluoride. The reaction is carried out in a solvent system consisting of tetrahydrofuran and methylene chloride containing from about 20% to about 40% tetrahydrofuran by volume. Other solvent systems, for example, dioxane and chloroform can be used, but it is preferred to use the tetrahydrofuran-methylene chloride system since reaction in this system affords crystalline products of relatively high purity.

From about 1.05 to about 1.5 molar equivalents of N-bromoacetamide are employed, preferably, from about 1.05 to about 1.15. An excess of from about 25 to about 100 molar equivalents anhydrous hydrogen fluoride, preferably, from about 45 to about 55 molar equivalents is used.

The reaction is carried out at a temperature of from about —80° C. to about —50° C., preferably, from about —80° C. to about —70° C. for a period of from about one to about sixteen hours, preferably, from about one to about two hours.

The product is isolated at the end of the reaction period by cautiously pouring the reaction mixture into an aqueous solution of potassium carbonate or bicarbonate containing sufficient alkaline reagent to neutralize substantially all of the acid present. The use of a sodium base is best avoided because the sodium fluoride which forms is of low solubility in water and its precipitation increases the mechanical difficulty of working with the mixture. The organic layer is separated and the aqueous layer, preferably, extracted with additional quantities of the methylene chloride or other water insoluble solvent used for the reaction. It is then washed with dilute aqueous alkaline reagent until neutral and finally with water. The desired compound is isolated from the organic layer, preferably, after drying over an anhydrous drying agent, such as anhydrous sodium sulfate by evaporation of the solvent in vacuo.

The hydroxyl group at the 3-position is next oxidized to form a 3-keto compound. The choice of oxidizing agent is not critical although it is preferred to use chromic acid in accordance with standard procedures. One procedure which is especially effective is to use 8N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be used.

If a 6-desfluoro compound is being prepared, it may be advantageous to convert the 3-hydroxy-$\Delta^5$-compound to a $5\alpha,6\beta$-dibromo compound which is then oxidized and debrominated. The dibromo compound is formed by reacting at least a molar equivalent of bromine with the steroid substrate in a halogenated hydrocarbon solvent containing up to two carbon atoms such as methylene chloride, chloroform or ethylene chloride, or from about 20 minutes to about 60 minutes at a temperature of from about $-5°$ C. to about $5°$ C. Oxidation is effected as described above. The bromine atoms are removed by reaction with zinc dust which should be used in excess, preferably from about 100% to about 200% excess. Reaction is effected in a lower alkanol solvent such as methanol or ethanol at a temperature of from about 35° C. to about 80° C. for a period of from one to about two hours. The addition of a halogenated hydrocarbon solvent may aid in maintaining the steroid in solution, but this is not necessary. The addition of a small amount of acetic acid followed by a short reflux period is often helpful in solubilizing some of the zinc salts. This is not essential, however. After the filtrate is removed, the solution which contains the 3-keto-$\Delta^5$-steroid is isomerized to form the desired 3-keto-$\Delta^4$-steroid by the addition of mineral acid such as hydrochloric or sulfuric acid to a pH of from about 0.2 to 1.2. Isomerization takes place while the mixture stands at a temperature of from about 20 to about 30° C. for a period of from about 30 to about 60 minutes.

In the next step in this valuable synthetic sequence, the $5\alpha$-bromine atom is removed. This is accomplished by heating the steroid compound in a reaction inert lower aliphatic oxygenated organic solvent containing up to eight carbon atoms in the presence of an alkaline reagent, preferably a salt such as, for example, sodium acetate, sodium propionate, potassium acetate, sodium carbonate or potassium bicarbonate which hydrolyzes to give a mildly alkaline solution. Other bases such as sodium or potassium hydroxide can be used, but there is some tendency towards degradative side reactions when these reagents are employed. Suitable solvents include, for example, methanol, ethanol, propanol, ethyl acetate, methyl propionate, methyl isopropyl ketone or di-n-butyl ketone.

At least a molar equipment of alkaline reagent, and preferably a molar excess of from about 30% to about 200% should be used.

The temperature range for obtaining optimum yields is from about 50° C. to about 130° C. The duration of the reaction is from about one-half to about four hours. It is preferred to carry the reaction out at a temperature range of from about 50° C. to about 75° C. for a period of from about one-half hour to about one hour. It is convenient to select a solvent with a boiling point under atmospheric conditions within the temperature range and to reflux the reaction mixture for the selected period of time.

Refluxing the steroid in methanol in the presence of sodium acetate for a period of about forty minutes provides very good yields.

The product is isolated in accordance with standard means known in the art. For example, it can be precipitated by the addition of water if the reaction solvent is water miscible. Alternatively, with a water immiscible solvent, the solvent may be evaporated in vacuo and the product purified by washing the residue with water. Further, purification may be affected by recrystallization from isopropanol or other suitable solvent or by trituration with ethyl acetate.

The reaction product from the foregoing reaction is then hydroxylated at the 11-position. This is accomplished microbiologically and the hydroxyl group introduced may be either in the $\alpha$- or the $\beta$-configuration. A number of organisms are known in the art as capable of affecting this hydroxylation. For example, the organism, *Rhizopus nigricans*, can be employed to produce an $11\alpha$-hydroxy compound in accordance with the procedure of Peterson et al. described in the Journal of the American Chemical Society, vol. 74, page 5933 (1952). Compounds with an $11\beta$-hydroxyl group can be prepared using, for example, *Curvularia lunata* according to the procedure described and claimed in U.S. Patent 2,658,023 issued November 3, 1953. Organisms of the genus Chaetomella, Spondylocladium or Epicoccum can also be used to prepare $11\beta$-hydroxylated steroids in accordance with the procedures described and claimed in U.S. Patents 2,882,205, 2,876,170 and 2,875,134 respectively. Other organisms which will introduce hydroxyl groups in either the $\alpha$-configuration or the $\beta$-configuration at the 11-position are well known.

In the next step in this synthesis, the 11-hydroxylated compound is dehydrated to form a $\Delta^{9(11)}$-compound. This is accomplished by first converting the steroid to an 11-sulfonyloxy compound, i.e., a sulfonate ester and subsequently removing a molecule of a sulfonic acid. The procedure is well known in the art and involves reaction with the appropriate sulfonyl halide. Suitable sulfonyl halides include both arylsulfonyl halides such as p-toluenesulfonyl chloride or p-bromo-sulfonyl chloride, and alkylsulfonyl halides such as methanes or ethanesulfonyl chloride. The preferred reagents are p-toluenesulfonyl chloride and methanesulfonyl chloride. The resulting esters are referred to respectively as tosylates or mesylates. In the preparation of $\Delta^{9(11)}$-steroids, the $11\alpha$-esters are generally isolated with the $11\beta$-esters generally are not.

The sulfonate ester is prepared by reacting the steroid in a hydrocarbon or halogenated hydrocarbon solvent containing up to eight carbon atoms or pyridine with at least a molar equivalent and preferably with an excess of from about 10% to about 40% of the selected sulfonyl halide. The reaction takes place in the presence of an alkaline reagent, preferably a nitrogenous base which will not react with the sulfonyl halide. Sufficient base should be employed to neutralize all of the hydrogen halide by-product which forms, although excesses, even up to 1000% or more can be used.

Suitable solvents include, for example, chlorobenzene, toluene, carbon tetrachloride, chloroform, methylene chloride or ethylene chloride. Dimethyl aniline, tributyl amine, or pyridine for examples of nitrogenous bases which can be successfully used.

Pyridine is especially useful and is preferred for this reaction, since it can serve both as a solvent and as a base.

Occasionally mixed solvent systems are used. Thus, the steroid will be taken up in pyridine and the acid chloride in chloroform. The latter is then added to the pyridine mixture.

The temperature of the reaction may vary from about 0° C. to about 40° C. The higher temperatures increase the rate of reaction. It is preferred to carry out the reaction at from about 25° C. to about 40° C. since this temperature range is consistent with a convenient rate of reaction and does not increase the cost of reaction by the necessity of destroying heat energy to attain the low temperature. The time of reaction varies from about 8 to about 60 hours. In the preferred temperature range, the time of reaction will be from about 8 to about 10 hours.

The product is isolated using standard means well known in the art. The reaction mixture may, for example, be quenched in ice water and the desired product isolated by extracting the aqueous mixture with an organic solvent such as one of those mentioned above. Chloroform is especially useful. The organic layer is usually washed with dilute mineral acid to decompose any excess base and then with water. The product is isolated by evaporating the solvent in vacuo, preferably after drying over an anhydrous drying agent such as anhydrous sodium or magnesium sulfate.

Conversion of the ester to the $\Delta^{9(11)}$-compound is effected by heating the compound together with an alkaline reagent, preferably an alkali metal salt of a lower fatty acid in a substantially anhydrous liquid solvent. Operable salts include sodium acetate, potassium acetate, and sodium or potassium propionate or butyrate. A molar equivalent of alkaline reagent can be used, but it is preferred to use from about a 200 to a 700% molar excess. Suitable solvents include lower fatty acids containing up to four carbon atoms and N-alkyl or N,N-dialkyl amide derivatives of these fatty acids an alkyl group containing up to two carbon atoms. They include, for example, formic acid, acetic acid, propionic acid, butyric acid, N-methyl formamide, N,N-dimethylformamide, N,N-diethylformamide or N-methyl acetamide. Other reagents capable of effecting the desired result include sodium iodide, potassium iodide or lithium bromide in acetone or a lower fatty acid.

The temperature range for the reaction is from about 30° C. to about 140° C. and the time of reaction is from about 10 minutes to about sixteen hours. The mesylate is more readily decomposed than the tosylate. In fact, it is possible to decompose the mesylate directly in the reaction mixture in which it is formed, but it is preferred, in the 11α series, to isolate the intermediate and to initiate a new reaction in order to obtain a $\Delta^{9(11)}$-compound of high purity.

The desired product may be isolated either by precipitation with water or by evaporating the solvent in vacuo and washing the residue with water. In a variation of the last procedure, the residue is taken up in an organic solvent such as chloroform; the solvent washed, dried and evaporated. Purification may be effected by recrystallization or trituration.

The 6β-fluoro-atom is next isomerized to form a 6α-fluoro compound. This is accomplished by treatment of the 6β-epimer with a prototropic agent such as water, alcohols, organic acids and mineral acids. Of these, mineral acids such as hydrochloric, hydrobromic, sulfuric and phosphoric are preferred. The reaction is carried out at from about −5° C. to about 10° C. for from about 2 to about 4 hours. In preferred operations, reaction is effected at from about 0° C. to about 10° C. for from about 2½ hours to about 3 hours. Suitable solvents for carrying out the reaction include halogenated hydrocarbons containing up to two carbon atoms and aliphatic acids as alkanols containing up to three carbon atoms or mixtures of these solvents. There may be mentioned by way of example methanol, ethanol, propanol, carbon tetrachloride, methylene chloride and chloroform. In a preferred embodiment of the process, the 6β-epimer, dissolved in chloroform and absolute methanol is treated with anhydrous hydrogen chloride for about 3 hours at 0° C. to 10° C. At the end of this period, the reaction mixture is diluted with chloroform, washed successively with sodium bicarbonate and water, dried and evaporated to dryness in vacuo. The product is obtained as a residue and may be purified by recrystallization using, for example, a mixture of isopropanol and methylene chloride.

The amount of isomerizing agent used in converting the 6β-epimer to the 6α-epimer is not critical. Theoretically, extremely small amounts of reagent are capable of effecting the desired result. In preferred operations, an anhydrous hydrogen halide, suitably hydrogen chloride or hydrogen bromide, is bubbled through the mixture until substantially all of the fluorine has been epimerized. However, other prototropic agents can be used, either organic or inorganic in aqueous or anhydrous form. As much as 50% by volume or even more of acid can be used to effect the desired result.

If desired, the compound is next converted to a 1,2-dehydro compound, i.e., a $\Delta^1$-compound. This can be accomplished chemically or microbiologically.

For the chemical conversion, the compound is treated with selenium dioxide in an inert solvent, i.e., a solvent which is inert to the reagent selenium dioxide, as well as non-injurious to the steroid compound and product. Solvents which are useful for this reaction include, for example, tertiary butanol, tertiary pentanol, benzene, ethylene glycol and various other glycol ethers, phenetole, xylene, dioxane and naphthalene. It will be noted that various high boiling alcohols, ethers and hydrocarbons may be utilized for the reaction.

In carrying out the reaction, it is generally preferred to utilize temperatures of from about 75° C. to about 200° C. for from about 1 hour to about 100 hours. If the solvent that is chosen is not sufficiently high boiling so that the desired elevated temperature, which assures reasonably rapid reaction is obtained, on heating to reflect at atmospheric pressure, then the mixture of solvent, steroid and selenium dioxide is subjected to elevated pressures so that the desired elevated temperature can be realized.

From one to ten molar equivalents of selenium dioxide is employed and it may be added in several different portions during the course of the reaction.

Preferred conditions include the addition of a lower fatty acid such as acetic acid to a tertiary butanol mixture.

The product is isolated in accordance with standard means after filtering the reaction mixture to remove solid residual material. The mixture may be simply evaporated in vacuo to leave the desired product as a residue which is then purified by recrystallization or chromatography. Alternatively, the filtrate may be washed with various reagents designed to remove residual impurities before it is evaporated. This procedure is illustrated in the examples.

If a microbiological method is selected for introducing the double bond at the 1,2-position, a number of organisms are available. There may be mentioned by way of example, *Corynebacterium simplex* as described by Bernstein et al. in the Journal of the American Chemical Society, 78, 5693 (1956), and organisms of the genus Mycobacterium as described in U.S. Patent 2,905,592, issued on September 22, 1959. Particularly useful are organisms of the genus Nocardia including, for example, *Nocardia opaca* ATCC 4276 and *Nocardia globerula* ATCC 9356. The steroid is subjected to the oxidizing, that is, the dehydrogenating activity of the selected organism. There are several procedures which may be used for the dehydrogenation. In the first of these, nutrient media are seeded with slants of the selected organism. Such a medium may consist, for example, of a mixture of standard bacteriological nutrient broth base, together with added carbohydrate. The cultivation of the various organisms in accordance with this procedure has been described in considerable detail in many publications. The seeded, sterile, nutrient solutions may be grown in shake flasks for two to three days to provide inoculum for larger vessels and in turn, the larger, stirred, aerated vessels may be used for the inoculation of full production scale vessels for submerged fermentation. The same medium of the type described above may be used for the large scale dehydrogenation of steroids according to this process. Considerable variation may, of course, be made in the medium. In general, there is required a carbohydrate, a source of organic nitrogen, mineral salts and various trace metals.

Rather than conducting the dehydrogenation in the presence of the whole fermentation broth, the cells may be removed from growing cultures and these may be resuspended in a medium which is designated the enzyme reaction mixture. Such a mixture may consist, for example, of a solution which is 0.01 molar in sodium fumarate or other hydrogen acceptor or in magnesium sulfate and 0.03 molar in sodium citrate. The presence of a certain amount of adenosine triphosphate, for example, 0.125% is also quite useful. Centrifuged, washed cells of the chosen organism may be suspended in this type of reaction mixture which is adjusted to a pH of about 6, for example, with citric acid. After addition of the steroid compound which it is desired to oxidize, the mixture may be incubated at about 37° C. and samples may be removed from time to time to determine the point at which maximum conversion of the steroid has taken place. In general, this occurs after about one to several days. The cells from about 100 ml. of the stirred, aerated cultures may be suspended in about 20 ml. of an enzyme reaction mixture for suitable results. Considerable variation may be made in these proportions. The steroid compound may be used in a proportion of about 25 to about 200 mg./ml. of the enzyme reaction mixture. The compound in solid form is merely added to the medium after adjustment of the pH. The flasks are stoppered with cotton so that they are exposed to the air during the incubation. It is preferred to use a small volume compared to the volume of the flask, for example, 20 ml. in a 125 ml. Erlenmeyer flask. Alternatively, the mixture may be stirred and aerated. In general, a hydrogen acceptor, a divalent metal, particularly magnesium and a buffer are required in the medium.

Rather than removing the cells and carrying out the reaction in an enzyme reaction mixture, the steroid compound may be added directly to a sterilized portion of the nutrient medium such as is described above and the medium is then seeded with the chosen organism. Approximately, the same proportion of chosen steroid compound may be used in this case also. Samples of the agitated aerated mixture may be removed at intervals for determination of the conversion of the steroid compound to the oxidized products. The mixture is maintained at between 20° C. and 37° C. or higher during the growth of the cells and the conversion of the steroid. In general, about one-half to seven days are required for maximum production of the dehydrogenated compounds. Alternatively, the growth of cells may be established before the addition of the steroid.

A third method which is also very useful for the dehydrogenation of the substrate involves the use of oxidizing enzymes produced by the organism. These may be prepared by a variety of methods from the cells of the organism. These materials may be released from the cells by different procedures. These include grinding, particularly with abrasive materials such as powdered glass or sand which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° C. to about 50° C. The cells disintegrate within one to several days and the cell residue may be removed by filtration, for example, through a Seitz filter or through a sintered glass bacterial filter. A third method for preparing cell-free elaboration products of an organism used for dehydrogenation is by repeated, rapid freezing and thawing of the cellular material. Another method is by the use of ultrasonic energy to rupture the cells. One further method of use for the same purpose is by the use of a water miscible solvent, particularly acetone. The cells when placed in such a solvent are ruptured and an extract of the desired enzymes is obtained. The enzymes may be used for dehydrogenation in media, similar to those used with the grown cells, that is, one containing a hydrogen acceptor such as fumarate, a buffer and in some cases, a bivalent metal, particularly, magnesium as well as a minor proportion of denosine triphosphate. The cell-free oxidizing enzymes of the organism may be used in media indicated above at a temperature of about 20° C. to about 40° C. In general, the oxidation of the desired steroid compound is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks Manometric Techniques in Tissue Metabolism by W. W. Umbreit et al., Burgess Publishing Company, Minneapolis (1949), and Respiratory Enzymes by H. Lardy, Burgess Publishing Company, Minneapolis (1949).

The use of this process in connection with dehydrogenations using organisms of the genus Nocardia is described in detail in copending patent application Serial No. 538,514, filed October 4, 1955, now abandoned.

The products may be isolated by known methods, for example, by extraction with various water immiscible organic solvents. Lower halogenated hydrocarbons such as chloroform are particularly useful. After extraction, the solvent may be removed by distillation and the solid product then isolated. Further purification may be affected by recrystallization from suitable organic solvents, for example, ethyl acetate. Chromatographic methods employing paper, alumina or other suitable solid absorbent materials can also be used.

Reference is made above to the use of various 11-hydroxylating organisms in the course of this invention. The procedures set forth in detail for dehydrogenation are also useful for hydroxylating. For the reaction, the steroid compound is contacted with the oxygenating activity of the selected microorganism to introduce the hydroxyl group in accordance with one of the procedures set forth above.

In the next step of this synthesis, the $\Delta^4$- or $\Delta^{1,4}$-compound is converted to a 21-iodo compound under highly selective conditions. The reaction involves the treatment of the steroid in a solvent system consisting of tetrahydrofuran and a lower alkanol containing up to four carbon atoms in a volume ratio of two to one with from 4 to 6 molar equivalents of calcium oxide and 1.5 to 2 molar equivalents of iodine, the solvent system containing tertiary butyl hydroperoxide in a quantity equivalent to from 0.006 to 0.018 g. iodine/ml. tetrahydrofuran. The temperature of the reaction is from about 2 to about 5 hours.

The product may be isolated by pouring the reaction mixture into water which may contain sodium thiosulfate and acetic acid whereupon the desired product precipitates and can be recovered by filtration. The purpose of the thiosulfate and acetic acid is to destroy excess iodine.

The reaction may be carried out in an inert atmosphere, for example, a nitrogen atmosphere to minimize side reactions. This is not necessary, however.

It will be noted that the introduction of the iodine atom at the 21-position makes the 21-carbon atom asymmetric and thus gives rise to the possibility of two epimeric forms when the iodine atom is converted to a hydroxyl group.

A surprising advantage of this procedure is that only the secondary carbon atom adjacent to the carbonyl group in the side chain is iodinated. The carbon atom adjacent to the carbonyl group at the 3-position is not iodinated, even with 1,2-dihydro compounds.

The iodo compound is next converted to an acyloxy compound by replacement of the iodine atom with an acyloxy group containing up to five carbon atoms. Basically, this is a reaction with a sodium or potassium salt of an organic acid, and it may be carried out either by direct addition of the sodium or potassium salt to a solution of the iodo steroid or by in situ formation of the salt in the solution containing the steroid. In either event, the reaction is between the iodo steroid and the salt, for example, sodium or potassium acetate, propionate, butyrate or valerate, and takes place in a lower aliphatic oxygenated solvent containing up to five carbon atoms including esters such as ethyl acetate or ketones such as acetone or methyl isopropyl ketone. The reaction takes place at a temperature of from about 40° C. to about 100° C. during a period of from about four to about twenty-four hours. A large excess of salt is generally employed to insure complete reaction of the steroid. Thus, a quantity of the salt ranging from about 200% to about 2000% or even more is used with from about 1000% to about 2000% being preferred.

In a preferred operation, the salt is generated in situ by adding the steroid in acetone to an acetone solution containing equimolar portions of potassium bicarbonate and acetic acid or other selected acid and refluxing the mixture for from about 10 to about 16 hours. A sufficient quantity of acid and salt should be used to generate the desired excess of the potassium salt.

Whichever procedure is used, the product may be isolated by removing the solvent in vacuo and washing the residue with a minimum amount of water to remove the inorganic salts. Alternatively, the reaction mixture may be diluted with water and the resulting solution filtered to obtain the desired compound or extracted with an organic solvent. Suitable solvents include hydrocarbon and halogenated hydrocarbon solvents containing up to seven carbon atoms including, for example, benzene, toluene, chlorobenzene, carbon tetrachloride or chloroform. The product is isolated from the organic solution preferably by removal of the solvent in vacuo. It is desirable although not necessary to dry the organic solution over an anhydrous drying agent such as sodium or magnesium sulfate before evaporating the solvent.

The $\Delta^{4,9(11)}$-21-acyloxy compound obtained from the previous reaction is next converted to a 9α-bromo-11β-hydroxy compound by reaction with hypobromous acid, preferably, generated in situ by treatment of N-bromoacetamide or N-bromosuccinimide with an aqueous solution of a strong acid such as sulfuric, p-toluenesulfonic, trichloroacetic or perchloric acid. The last mentioned of these is preferred. The reaction is preferably carried out in peroxide-free dioxane containing the selected hypobromous acid releasing agent and an aqueous acid. Preferably an excess of hypobromous acid releasing agent of from about 10% to about 25% is employed, although greater or lesser amounts say from equimolar to about 50% excess can also be used. A mole to mole ratio of strong acid and hypobromous acid releasing agent is used. The resulting reaction is obviously between the steroid and from an equimolar to about a 50% excess of hypobromous acid. The temperature of the reaction is from about 20 to about 40° C. and the duration is from about 1 to about 4 hours.

The product may be isolated by admixing the reaction mixture with water and filtering the resulting precipitate. It is convenient to decompose excess perchloric acid by the addition of sodium sulfite or hyposulfite before precipitation with water. Purification may be accomplished by recrystallization from a suitable solvent such as acetone.

In a preferred embodiment, the $\Delta^{4,9(11)}$-compound is dissolved in peroxide-free dioxane and aqueous perchloric acid is added. Solid N-bromoacetamide is added and the mixture is kept in the dark at room temperature for one hour. The excess perchloric acid is destroyed by the addition of sodium sulfite and the product isolated as described above.

As is stated above, the 9α-bromo compounds obtained by this reaction are described and claimed in copending patent application, Serial No. 3,996, filed January 22, 1960.

The 9α-bromo-11β-hydroxy compound is next converted to a 9β,11β-epoxide. This is accomplished by reaction with sodium or potassium acetate. Other alkaline reagents such as sodium or potassium carbonate and bicarbonate may be used, but these are not preferred since the 21-ester group is hydrolyzed and must be re-esterified. The reaction may be effected in water, or preferably dioxane, or a lower alkanol solvent such as methanol or ethanol at a temperature of from about 20° C. to about 75° C. during a reaction period of from about one to about twenty hours. The higher temperatures favor shorter reaction periods. A solvent mixture can also be used. An equimolar quantity of alkaline reagent can be used, but it is preferred to use a molar excess of from about 10% to about 200%.

The product is recovered by standard means. If water is used, the reaction mixture is extracted with an organic solvent such as methylene chloride or chloroform. If an alkanol or a mixture of water and alkanol is used, the alkanol is removed in vacuo and the residue extracted or taken up in an organic solvent. The desired product is isolated from the organic solution by evaporation of the solvent in vacuo, preferably after drying over an anhydrous drying agent such as sodium or magnesium sulfate.

Conversion of the epoxide to a 9α-fluoro-11β-hydroxyl compound is effected by the action of anhydrous hydrogen fluoride in the presence of an organic proton acceptor such as a lower alkanol containing up to three carbon atoms, dioxane or tetrahydrofuran. The last mentioned of these reagents is preferred. Suitable solvents for carrying out the reaction include hydrocarbon and halogenated hydrocarbon solvents containing up to eight carbon atoms such as benzene, chlorobenzene, hexane, octane, carbon tetrachloride, methylene chloride, ethylene chloride and chloroform. The reaction is carried out at a temperature of from about −70° C. to about 30° C. With $\Delta^4$-compounds, lower temperature within this range, say from −70° C. to 0° C. are preferred. With $\Delta^{1,4}$-compounds, the preferred temperature range is from about −15° C. to about 25° C. The duration of the reaction is from about 4 to about 20 hours. An excess of hydrogen fluoride is used. The amount of the excess is not critical and may vary from 100% or less to as high as 800% or even more.

The product is isolated, for example, by admixture with dilute aqueous alkaline reagent such as aqueous sodium bicarbonate or potassium bicarbonate, containing enough base to neutralize the acid. Extraction of the mixture with an organic solvent such as chloroform followed by washing with water, drying over an anhydrous reagent such as sodium sulfate, filtration, and removal of the solvent yields the desired product. The product may be further purified by recrystallization from a suitable solvent such as ethyl acetate.

In a preferred method, a reaction mixture containing a molar ratio of anhydrous hydrogen fluoride to tetrahydrofuran of from about 1.7:1 to about 4:1 is pre-cooled to the desired temperature and a pre-cooled steroid solution of steroid in chloroform is added. The mixture is allowed to stand at the selected temperature for about 4 hours and then isolated.

As stated above, the process of this invention can be used to prepare 3-keto-$\Delta^4$-steroids or 3-keto-$\Delta^{1,4}$-steroids within the purview of the invention with or without a fluorine atom at the 6α-position. As an aid in the understanding of the invention, the following reaction sequences are set forth, illustrating the preparation of a 3-keto-Δ¹,⁴-compound of the invention and a 6α-fluoro-3-keto-Δ⁴-compound of the invention. Each of the sequences starts with 21-methyl-Δ⁵-pregnene-3β,17α-diol-20-one prepared as illustrated above.

REACTION SEQUENCE I.—9α-FLUORO-21-METHYL-Δ¹,⁴-PREGNADIENE-11β,17α,21-TRIOL 3,20-DIONE

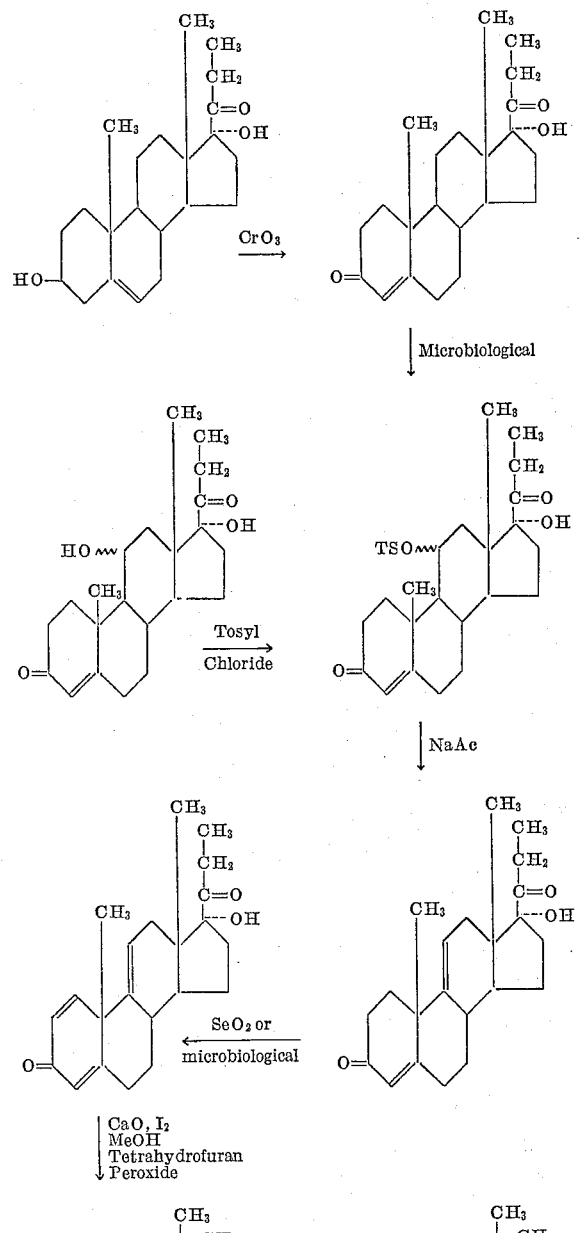

REACTION SEQUENCE II.—6α,9α-DIFLUORO-21-METHYLENE-Δ⁴-PREGNENE-11β,17α,21-TRIOL-3,20-DIONE

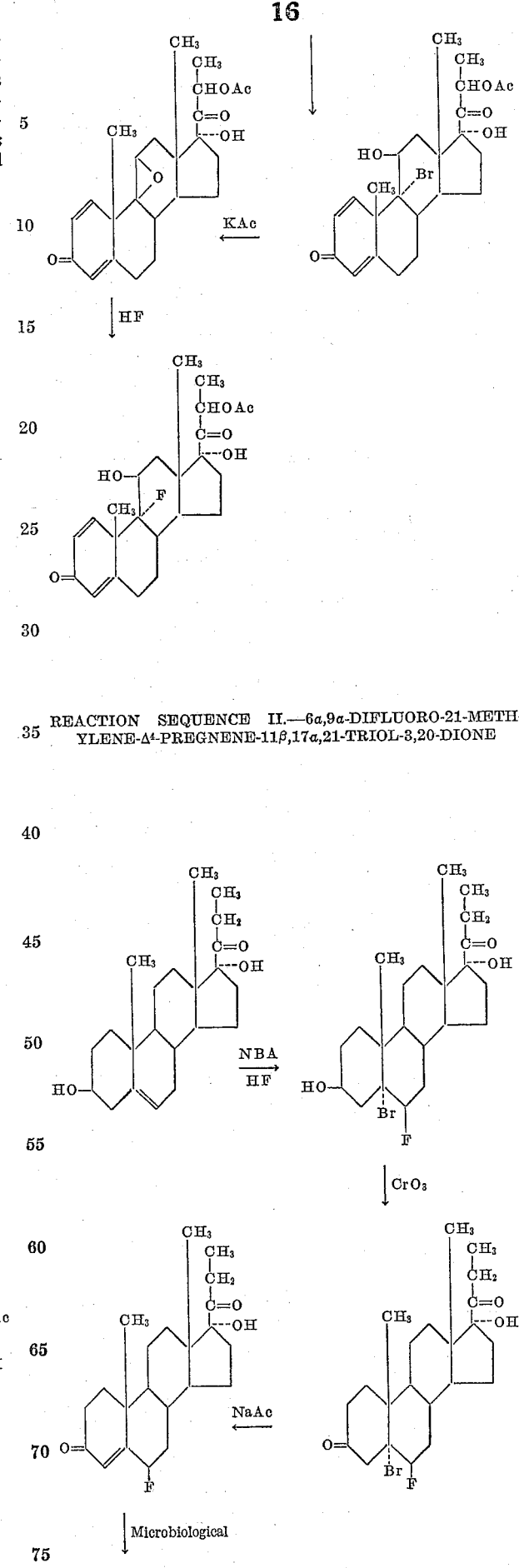

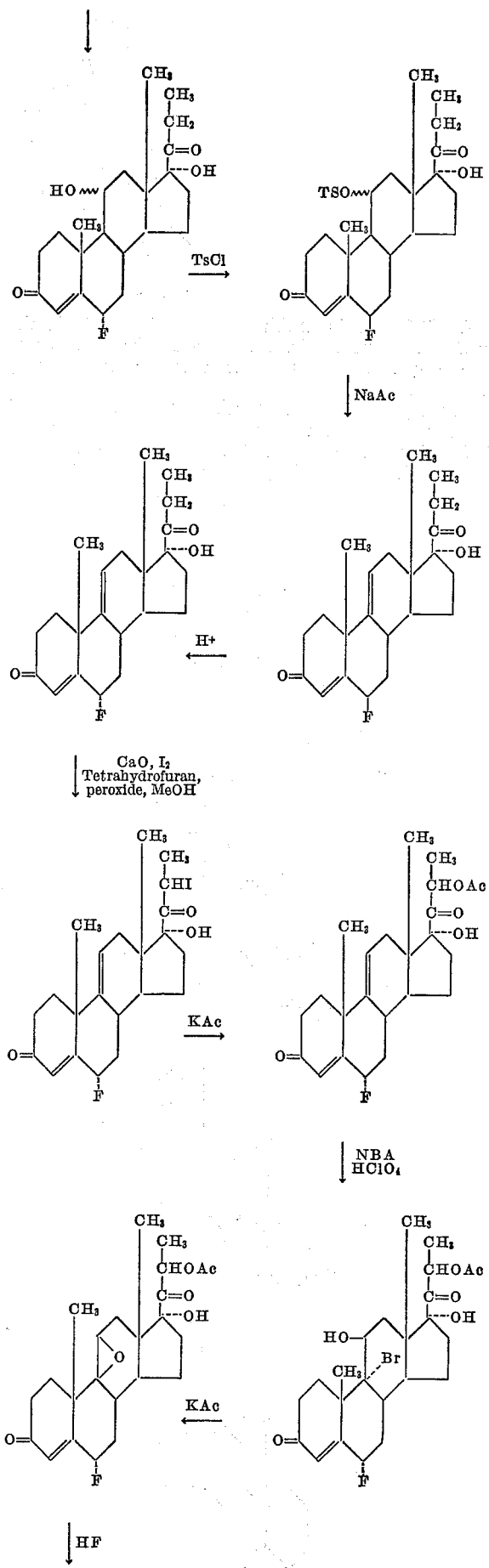

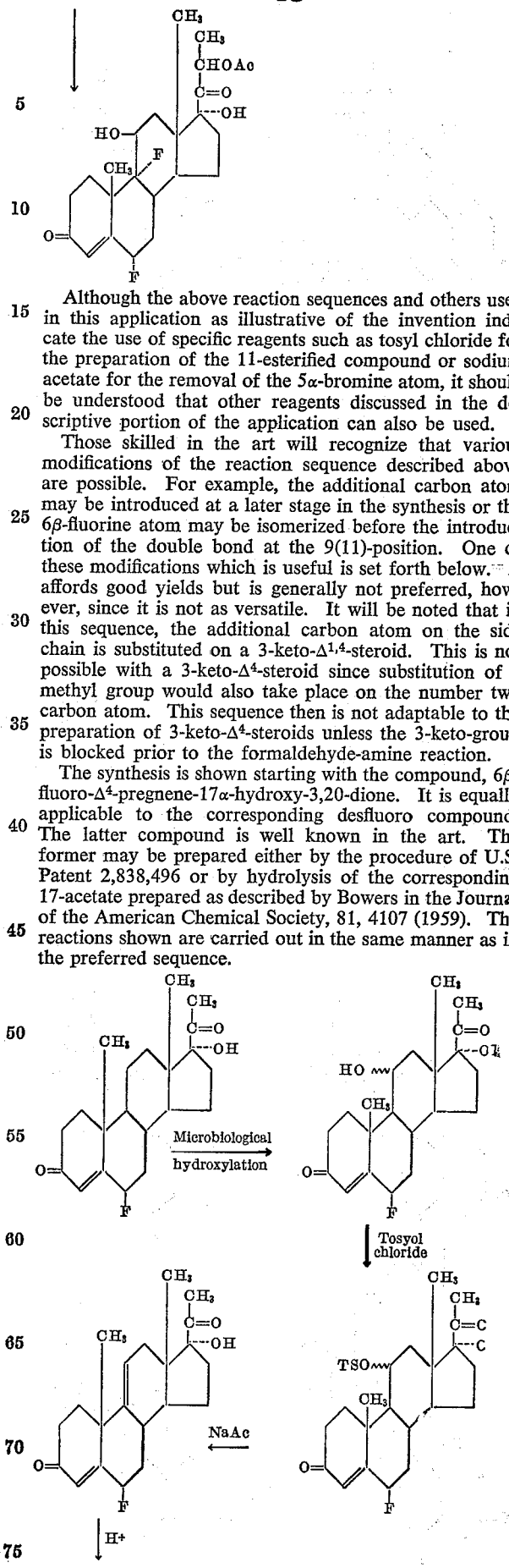

Although the above reaction sequences and others used in this application as illustrative of the invention indicate the use of specific reagents such as tosyl chloride for the preparation of the 11-esterified compound or sodium acetate for the removal of the 5α-bromine atom, it should be understood that other reagents discussed in the descriptive portion of the application can also be used.

Those skilled in the art will recognize that various modifications of the reaction sequence described above are possible. For example, the additional carbon atom may be introduced at a later stage in the synthesis or the 6β-fluorine atom may be isomerized before the introduction of the double bond at the 9(11)-position. One of these modifications which is useful is set forth below. It affords good yields but is generally not preferred, however, since it is not as versatile. It will be noted that in this sequence, the additional carbon atom on the side chain is substituted on a 3-keto-Δ$^{1,4}$-steroid. This is not possible with a 3-keto-Δ$^4$-steroid since substitution of a methyl group would also take place on the number two carbon atom. This sequence then is not adaptable to the preparation of 3-keto-Δ$^4$-steroids unless the 3-keto-group is blocked prior to the formaldehyde-amine reaction.

The synthesis is shown starting with the compound, 6β fluoro-Δ$^4$-pregnene-17α-hydroxy-3,20-dione. It is equally applicable to the corresponding desfluoro compound. The latter compound is well known in the art. The former may be prepared either by the procedure of U.S. Patent 2,838,496 or by hydrolysis of the corresponding 17-acetate prepared as described by Bowers in the Journal of the American Chemical Society, 81, 4107 (1959). The reactions shown are carried out in the same manner as in the preferred sequence.

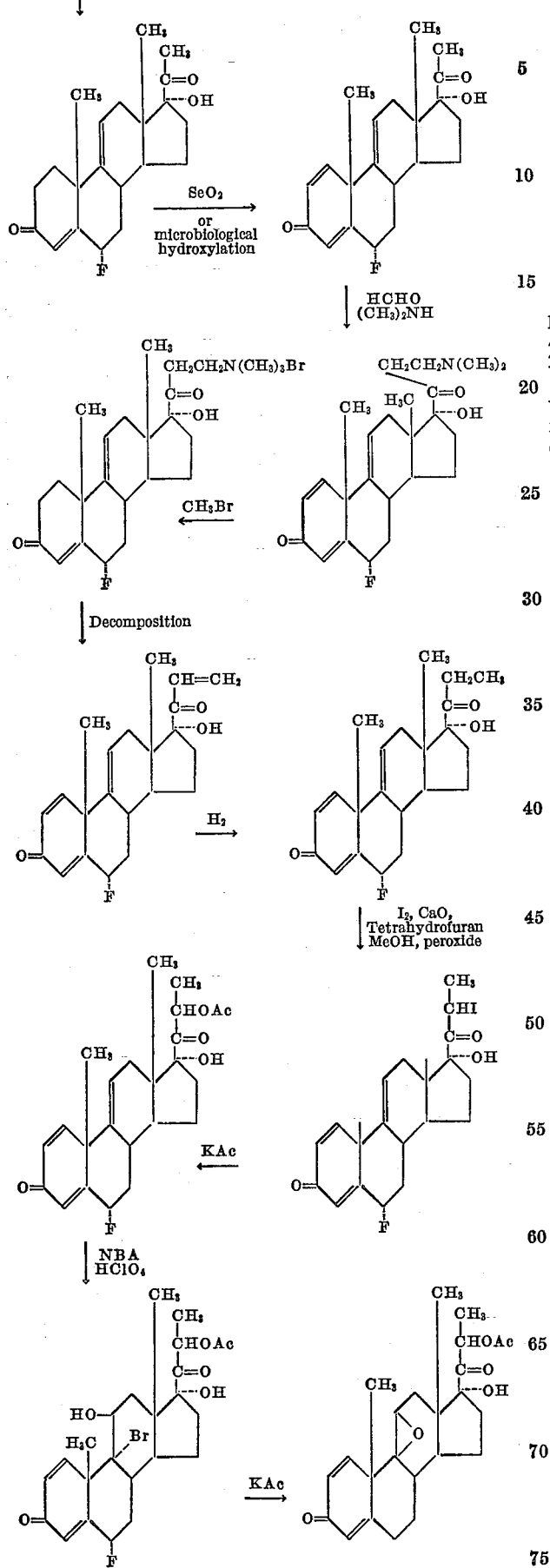

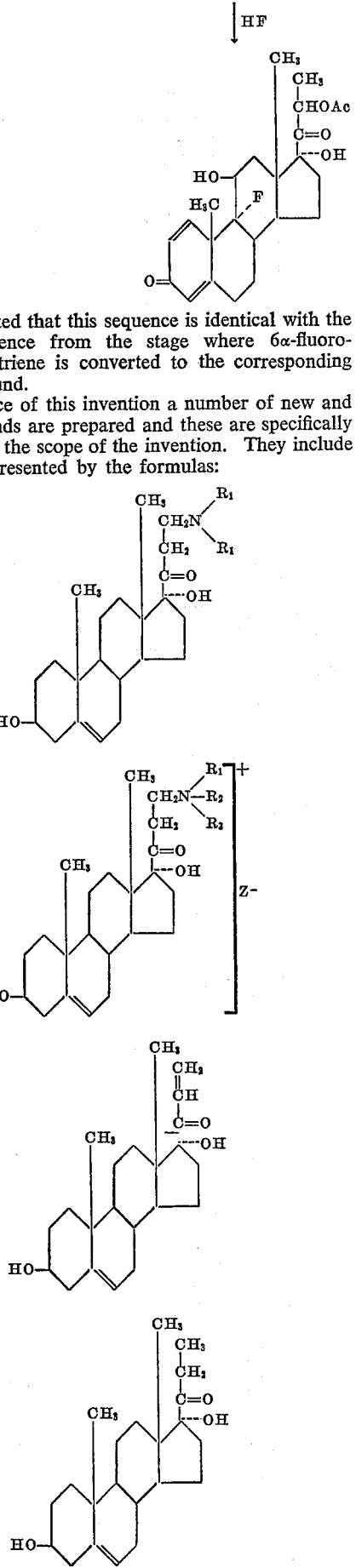

It will be noted that this sequence is identical with the preferred sequence from the stage where 6α-fluoro-$\Delta^{1,4,9(11)}$-pregnatriene is converted to the corresponding 21-iodo compound.

In the practice of this invention a number of new and useful compounds are prepared and these are specifically included within the scope of the invention. They include compounds represented by the formulas:

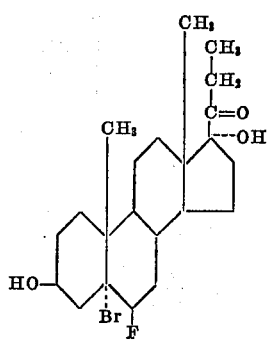
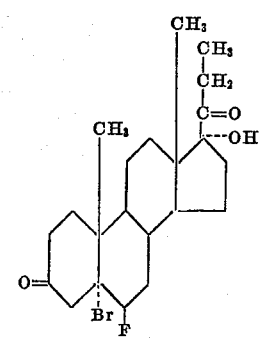
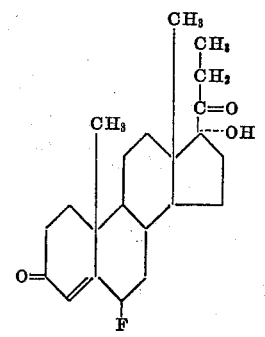
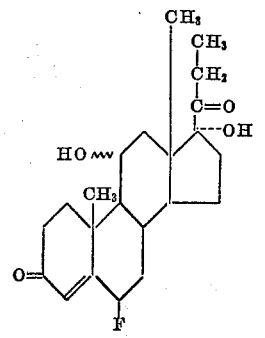
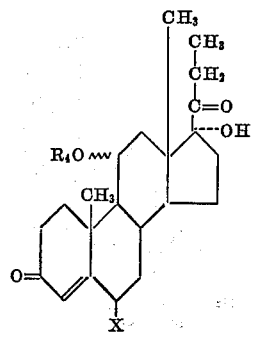
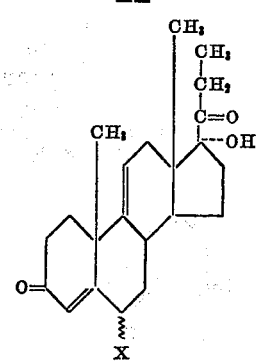
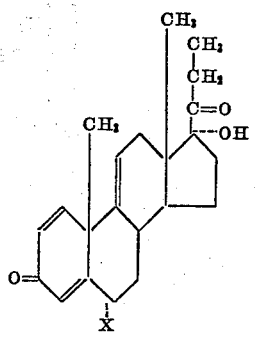
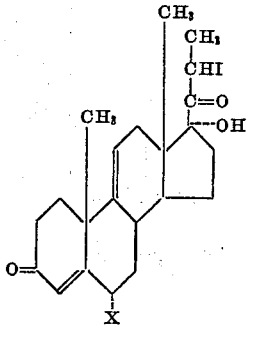
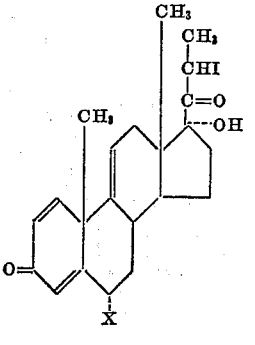
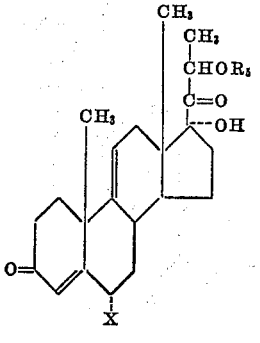

23
24
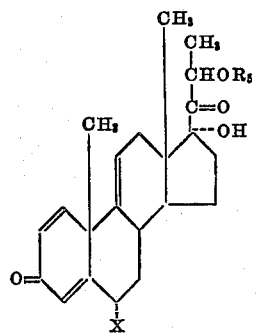
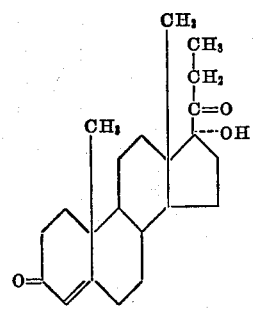
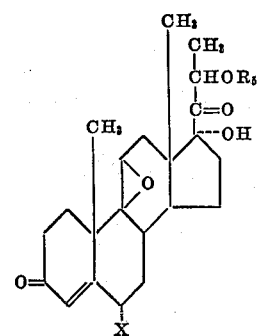
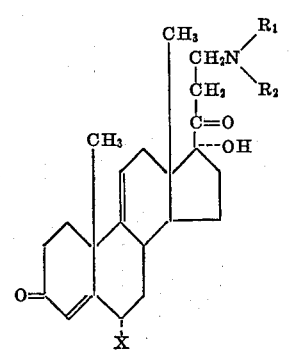
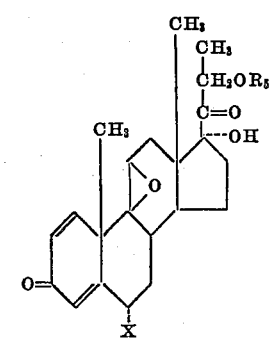
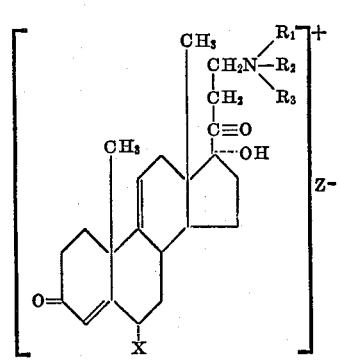
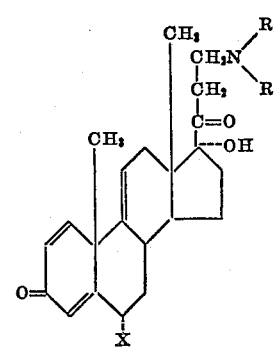
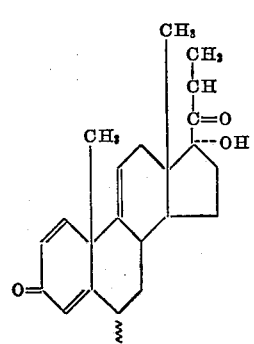
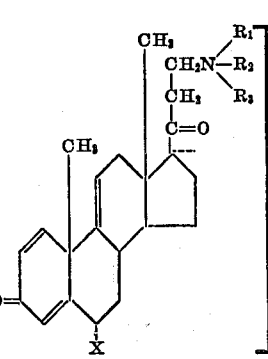
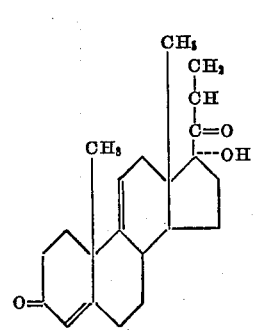

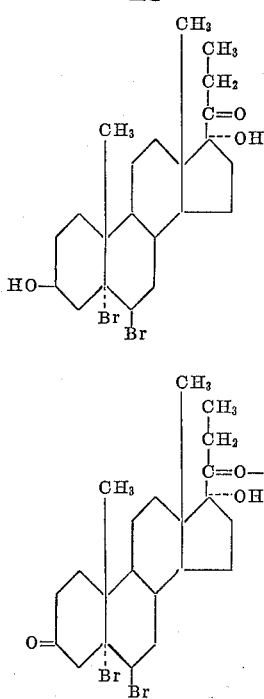

In the above formulas, $R_1$, $R_2$ and $R_3$ which may be the same or different in a particular compound are alkyl groups containing up to four carbon atoms, $R_4$ is tosyl or mesyl, $R_5$ is acyl hydrocarbon containing only carbon, hydrogen or oxygen up to a total of five carbon atoms, Z is halogen and X is hydrogen or fluorine.

The following examples are given solely for the purpose of illustration only and are not to be construed as limitations of this invention, many apparent variations of which are possible without departing from the spirit or scope thereof.

EXAMPLE I

*21-Dimethylaminomethyl-$\Delta^5$-Pregnene-3β,17α-Diol-20-One*

A total of 25 grams of $\Delta^5$-pregnene-3β,17α-diol-20-one was taken up in 350 ml. of methanol containing 12 grams of paraformaldehyde and 40 grams of dimethylamine hydrochloride. The mixture was maintained at 90° C. under pressure for 24 hours. The hot mixture was filtered and the solution evaporated in vacuo. The residue was digested with hot 0.25 N hydrochloric acid, filtered and the filtrate made basic with 10% sodium carbonate. The solution was extracted with chloroform, the organic layer dried over anhydrous sodium sulfate, filtered and the solvent removed in vacuo to leave the desired product as a residue.

EXAMPLE II

*6α-Fluoro-21-Dimethylaminomethyl-$\Delta^{1,4,9(11)}$-Pregnatriene-17α-ol-3,20-Dione*

A total of 35 grams of 6α-fluoro-$\Delta^{1,4,9(11)}$-pregnatriene-17α-ol-3,20-dione was taken up in 500 ml. of n-amyl alcohol containing 20 grams of paraformaldehyde, 60 grams of dimethylamine sulfate and 2 ml. of dilute sulfuric acid. The mixture was refluxed for 2 hours in a nitrogen atmosphere and filtered, and the solvent removed in vacuo. The residue was digested with 150 ml. of hot 0.25 N sulfuric acid and filtered. The filtrate was adjusted to an approximate pH of 11 with 10% sodium carbonate, and extracted with chloroform. The chloroform solution was dried over anhydrous magnesium sulfate, filtered and the desired product obtained by evaporating the solvent in vacuo.

EXAMPLE III

*6α-Fluoro-21-Dimethylaminomethyl-$\Delta^{1,4,9(11)}$-Pregnatriene-17α-ol-3,20-Dione*

A total of 10 grams of 6α-fluoro-$\Delta^{1,4,9,(11)}$-pregnatriene-17α-ol-3,20-dione was taken up in 500 ml. of N-butanol containing 4.8 grams of paraformaldehyde, 16 grams of dimethylamine hydrochloride and 15 drops of 3 N hydrochloric acid. The solution was refluxed under nitrogen for 4 hours during which time an additional 1 ml. of 3 N hydrochloric acid was added to maintain the acidity at a pH of approximately 2.5. The solvent was removed in vacuo and the residue digested with two 200 ml. portions of hot 0.25 N hydrochloric acid. The residue was washed with water, filtered and the filtrate adjusted to a pH of approximately 10 with 10% aqueous sodium carbonate and extracted with benzene. The benzene solution was dried over anhydrous sodium sulfate, filtered and the solvent removed in vacuo to leave the desired product as a residue.

EXAMPLE IV

*21-Methyl-Ethylaminomethyl-$\Delta^{1,4,9(11)}$-Pregnatriene-17α-ol-3,20-Dione*

A total of 25 grams of $\Delta^{1,4,9(11)}$-pregnatriene-17α-ol-3,20-dione was taken up in 350 ml. of methanol containing 12 grams of paraformaldehyde and 40 grams of methyl ethylamine phosphate and 10 ml. of 2.5 N phosphoric acid. The mixture was maintained at 100° C. under pressure for 20 hours during which time an additional small portion of 2 N phosphoric acid was added to maintain the acidity at a pH of 5.0. The hot mixture was filtered and the solution evaporated in vacuo. The residue was digested with hot 0.2 N phosphoric acid, filtered and the filtrate made basic with 10% sodium carbonate. The solution was extracted with ethylene dichloride. The organic layer was dried over anhydrous sodium sulfate, filtered and the solvent removed in vacuo to leave the desired product as a residue.

EXAMPLE V

*21-Dibutylaminomethyl-$\Delta^{1,4,9(11)}$-Pregnatriene-17α-ol-3,20-Dione*

A total of 20 grams of $\Delta^{1,4,9(11)}$-pregnatriene-17α-ol-3,20-dione was taken up in 750 ml. of n-butanol containnig 15 grams of paraformaldehyde, 20 grams of dibutylamine hydrochloride and 15 drops of 3 N hydrochloric acid. The solution was refluxed under nitrogen for 6 hours during which time an additional 1 ml. of 3 N hydrochloric acid was added to maintain the acidity at a pH of approximately 3. The solvent was removed in vacuo and the residue digested with two 300 ml. portions of hot 0.25 N hydrochloric acid. The residue was washed with water, filtered, and the filtrate adjusted to a pH of approximately 10 with 10% aqueous sodium carbonate. It was then extracted with chloroform. The chloroform solution was dried over anhydrous sodium sulfate, filtered and the solvent removed in vacuo to leave the desired product as a residue.

EXAMPLE VI

*21-Diethylaminomethyl-$\Delta^5$-Pregnene-3β-17α-Diol-20-One*

A total of 35 grams of $\Delta^5$-pregnene-3β,17α-diol-20-one was taken up in 500 ml. of butanol containing 20 grams of paraformaldehyde, 60 grams of diethylamine hydrobromide and 3 ml. of 40% aqueous hydrobromic acid. The mixture was refluxed for 2 hours and filtered. The filtrate was evaporated in vacuo and the residue digested with 150 ml. of hot 0.25 N hydrochloric acid and filtered. The filtrate was adjusted to an approximate pH of 10 with 10% sodium carbonate. The aqueous solution was extracted with carbon tetrachloride, the organic layer dried over anhydrous magnesium sulfate, filtered and the desired product obtained by removing the solvent in vacuo.

EXAMPLE VII

*Preparation of Quaternary Ammonium Compounds*

The following procedures are illustrative of the methods used to prepare the quaternary ammonium halides used in this invention.

A solution of 7.5 grams of product prepared in Example I in 180 ml. of methanol containing 80 ml. of methyl bromide was allowed to stand overnight and the mixture was then evaporated to dryness in vacuo. The residue was triturated with acetone and the desired product recovered by filtration. An additional crop of the quaternary compound may be obtained by evaporation of the acetone filtrate and this is purified by trituration with methanol and recovered by filtration. The product obtained was 21-dimethylaminomethyl-$\Delta^5$-pregnene-$3\beta,17\alpha$-diol-20-one methobromide.

A solution of 7.5 grams of the product obtained in Example II in 150 ml. of ethanol containing a 50% molar excess of butyl chloride was allowed to stand at 25° C. for 16 hours and the mixture was then evaporated to dryness in vacuo. The residue was triturated with acetone and the desired product recovered by filtration. The product obtained was 6$\alpha$-fluoro-21-dimethylaminomethyl-$\Delta^{1,4,9(11)}$-pregnatriene-17$\alpha$-ol-3,20-dione butyl chloride.

A solution of 8 grams of the product obtained in Example III in 200 ml. of methanol containing a 20% molar excess of ethyl iodide was allowed to stand for 20 hours at approximately 28° C. and the mixture was then evaporated to dryness in vacuo. The residue was triturated with ether and the desired product recovered by filtration. The product obtained was 6$\alpha$-fluoro-21-dimethylaminomethyl-$\Delta^{4,9(11)}$-pregnadiene-17$\alpha$-ol-3,20-dione ethyl iodide.

Other quaternary alkyl ammonium halide salts of the products prepared in Examples I through VI in which the alkylating agent contains up to four carbon atoms are prepared in accordance with the procedure of this example.

EXAMPLE VIII

*21-Methylene-$\Delta^5$-Pregnene-$3\beta,17\alpha$-Diol-20-One*

A solution of 200 mg. of 21-dimethylaminomethyl-$\Delta^5$-pregnene-$3\beta,17\alpha$-diol-20-one methyl bromide in 10 ml. of water was prepared and clarified by filtration. To the solution there was added 68 mg. of sodium bicarbonate in 2 ml. of water at 25° C. A white precipitate separated and the suspension was stirred for one hour, filtered, washed with water and dried in vacuo.

EXAMPLE IX

*6$\alpha$-Fluoro-21-Methylene-$\Delta^{1,4,9(11)}$-Pregnatriene-17$\alpha$-ol-3,20-Dione*

A solution containnig 200 mg. of 6$\alpha$-fluoro-21-dimethylaminomethyl-$\Delta^{1,4,9(11)}$-pregnatriene-17$\alpha$-ol-3,20-one butyl chloride was dissolved in 10 ml. of water and stirred at 20° C. for 6 hours. The desired product was separated and recovered by filtration.

EXAMPLE X

*6$\alpha$-Fluoro-21-Methylene-$\Delta^{4,9(11)}$-Pregnadiene-17$\alpha$-ol-3,20-Dione*

A solution containing 200 mg. of 21-dimethylaminomethyl-$\Delta^{4,9(11)}$-pregnadiene-17$\alpha$-ol-3,20-dione methyl bromide was dissolved in 15 ml. of water and clarified by filtration. The solution was adjusted to pH 12 by the cautious addition of 2% sodium hydroxide at 30° C. A white precipitate separated and the suspension was stirred for 4 hours before recovering the desired product by filtration.

EXAMPLE XI

*21-Methylene-$\Delta^{4,9(11)}$-Pregnadiene-17$\alpha$-ol-3,20-Dione*

A solution containing 400 mg. of 21-methyl-ethyl-aminomethyl-$\Delta^{4,9(11)}$-pregnadiene-17$\alpha$-ol-3,20-dione ethyl chloride was dissolved in 15 ml. of water and the solution clarified by filtration. A 2% aqueous solution of sodium citrate in 2 ml. of water was added. The resulting mixture was stirred for 4 hours during which time the desired product separated and was recovered by filtration.

EXAMPLE XII

*21-Methylene-$\Delta^{1,4,9(11)}$-Pregnatriene-17$\alpha$-ol-3,20-Dione*

A solution containing 200 mg. of 21-dibutyl-aminomethyl-$\Delta^{1,4,9(11)}$-pregnadiene-17$\alpha$-ol-3,20-dione methyl bromide was dissolved in 15 ml. of water and stirred at 25° C. for 4 hours. The desired product separated and was recovered by filtration.

EXAMPLE XIII

*21-Methylene-$\Delta^5$-Pregnene-$3\beta,17\alpha$-Diol-20-One*

A solution containing 300 mg. of 21-diethylaminomethyl-$\Delta^5$-pregnene-$3\beta,17\alpha$-diol-20-one butyl chloride was dissolved in 20 ml. of water and adjusted to pH 9.5 with aqueous sodium carbonate. The mixture was stirred at 30° C. for 6 hours. The desired product separated and was recovered by filtration.

EXAMPLE XIV

*6$\alpha$-Fluoro-21-Methylene-$\Delta^{1,4,9(11)}$-Pregnatriene-17$\alpha$-ol-3,20-Dione*

A solution containing 150 mg. of 6$\alpha$-fluoro-21-di-n-propylaminomethyl-$\Delta^{1,4,9(11)}$-pregnatriene-17$\alpha$-ol-3,20-dione methyl iodide was dissolved in 15 ml. of water and stirred at 25° C. for 4 hours. The resulting mixture was extracted with chloroform, filtered and the desired product recovered by evaporation of the filtrate.

EXAMPLE XV

*21-Methylene-$\Delta^{4,9(11)}$-Pregnadiene-17$\alpha$-ol-3,20-Dione*

A solution containing 300 mg. of 21-diethylaminomethyl-$\Delta^{4,9(11)}$-pregnadiene-17$\alpha$-ol-3,20-dione butyl fluoride was stirred in 20 ml. of 5% aqueous sodium bicarbonate solution. The resulting mixture was made slightly acid with 2% aqueous hydrochloric acid and extracted with ethylene dichloride. The organic solvent was separated, dried over anhydrous sodium sulfate, filtered and the desired product isolated by evaporation of the solvent.

EXAMPLE XVI

*21-Methyl-$\Delta^5$-Pregnene-$3\beta,17\alpha$-Diol-20-One*

A total of 1 gram of 21-methylene-$\Delta^5$-pregnene-$3\beta,17\alpha$-diol-20-one was taken up in 300 ml. of 95% ethanol containing 250 mg. of palladium on carbon at 25 to 30° C. and hydrogen was bubbled in at atmospheric pressure. Reaction was stopped after 15 minutes and the catalyst removed by filtration. The catalyst was washed with an additional 50 ml. of 95% ethanol and the filtrates combined. The solvent was removed in vacuo leaving the desired product as a residue. It was recrystallized from ethyl acetate; M.P. 237–239° C.

Analysis for $C_{22}$, $H_{34}$, $O_3$:

| | Calculated | Found |
| --- | --- | --- |
| Carbon | 76.26 | 76.13 |
| Hydrogen | 9.89 | 9.82 |

EXAMPLE XVII

*6$\alpha$-Fluoro-21-Methyl-$\Delta^{1,4,9(11)}$-Pregnatriene-17$\alpha$-ol-3,20-Dione*

A total of 1 gram of 6$\alpha$-fluoro-21-methylene-$\Delta^{1,4,9(11)}$-pregnatriene-17$\alpha$-ol-3,20-dione was taken up in 300 ml. of methanol containing 1 gram of 5% palladium on calcium carbonate at 15° C. and agitated under hydrogen at 10 atmospheres pressure. Reaction was stopped after 1 molar equivalent of hydrogen had been adsorbed and the catalyst removed by filtration. The catalyst was washed with an additional 50 ml. of methanol and the filtrates combined. The solvent was removed in vacuo leaving the desired product as a residue.

EXAMPLE XVIII

6α-Fluoro-21-Methyl-$\Delta^{4,9(11)}$-Pregnadiene-17α-ol-3,20-Dione

A total of 1 gram of 6α-fluoro-21-methylene-$\Delta^{4,9(11)}$-pregnadiene-17α-ol-3,20-dione was taken up in 250 ml. of ethyl acetate containing 2½ grams of palladium catalyst at 40° C. and hydrogen was bubbled in at atmospheric pressure. Reaction was stopped after 1 molar equivalent of hydrogen was adsorbed and the catalyst removed by filtration. The catalyst was washed with an additional 50 ml. of ethyl acetate and the filtrates combined. The solvent was removed in vacuo leaving the desired product as a residue.

EXAMPLE XIX

21-Methyl-$\Delta^{4,9(11)}$-Pregnadiene-17α-ol-3,20-Dione

A total of 1 gram of 21-methylene-$\Delta^{4,9(11)}$-pregnadiene-17α-ol-3,20-dione was taken up in 250 ml. of di-n-butyl ketone containing 100 mg. of palladium catalyst and hydrogen was bubbled in at 5 atmospheres pressure. Reaction was stopped after 10 minutes and the catalyst removed by filtration. The catalyst was washed with an additional 30 ml. of di-n-butyl ketone and the filtrates combined. The solvent was removed in vacuo leaving the desired product as a residue.

EXAMPLE XX

21-Methyl-$\Delta^{1,4,9(11)}$-Pregnatriene-17α-Ol-3,20-Dione

A total of 1 gram of 21-methylene-$\Delta^{1,4,9(11)}$-pregnatriene-17α-ol-3,20-dione was taken up in 350 ml. of ethyl acetate containing 5 grams of palladium catalyst at 15° C. and hydrogen was bubbled in at atmospheric pressure for 60 minutes. The catalyst was removed by filtration, washed with an additional 50 ml. of chloroform and the filtrates combined. The solvent was removed in vacuo leaving the desired product as a residue.

EXAMPLE XXI

21-Methyl-$\Delta^5$-Pregnene-3β,17α-Diol-20-One

A total of 1 gram of 21-methylene-$\Delta^5$-pregnene-3β-17α-diol-20-one was taken up in 300 ml. of ethanol containing 500 mg. of palladium catalyst at 35° C. in a hydrogen atmosphere. At the end of 45 minutes, approximately one mole of hydrogen had been absorbed. The reaction mixture was then filtered to remove the catalyst. The catalyst was washed with an additional 20 ml. of acetic acid and the filtrates combined. The solvent was removed in vacuo leaving the desired product as a residue.

EXAMPLE XXII

6α-Fluoro-21-Methyl-$\Delta^{1,4,9(11)}$-Pregnatriene-17α-Ol-3,20-Dione

A total of 1 gram of 6α-fluoro-21-methylene-$\Delta^{1,4,9(11)}$-pregnatriene-17α-ol-3,20-dione was taken up in 250 ml. of acetone containing 750 mg. of palladium on carbon at 20° C. under a hydrogen atmosphere maintained at 2.5 atmospheres pressure. At the end of 5 minutes, the catalyst was removed by filtration and washed with an additional 35 ml. of acetone. The filtrates were combined and the solvent removed in vacuo leaving the desired product as a residue.

EXAMPLE XXIII

21-Methyl-$\Delta^{4,9,(11)}$-Pregnatriene-17α-Ol-3,20-Dione

A total of 1 gram of 21-methylene-$\Delta^{4,9(11)}$-pregnadiene-17α-ol-3,20-dione was taken up in 300 ml. of propanol containing 150 mg. of palladium on carbon at 25° C. and hydrogen was bubbled in at atmospheric pressure. Reaction was stopped after 30 minutes and the catalyst removed by filtration. The catalyst was washed with an additional 50 ml. of propanol and the filtrates combined. The solvent was removed in vacuo leaving the desired product as a residue.

EXAMPLE XXIV

5α-Bromo-6β-Fluoro-Pregnane-3β,17α-Diol-20-One

Anhydrous hydrogen fluoride (168 grams) was collected directly from the cylinder in a polyethylene vessel and cooled to −70° C. It was cautiously added to dry tetrahydrofuran also cooled to −70° C. and contained in a polyethylene vessel. Considerable heat was evolved, the temperature rising to approximately 0° C. The mixture was re-cooled to −70° C. and then added with vigorous stirring to a suspension of finely powdered N-bromoacetamide (26.75 grams) and $\Delta^5$-pregnene-3β,17α-diol-20-one (55 grams) in 435 ml. of methylene chloride at −70° C. After maintaining for one hour at between −50° C. and −70° C., the entire reaction mixture was poured cautiously into 3 liters of water containing 800 grams of potassium carbonate, the mixture being stirred during the addition. The organic layer was separated and the aqueous layer extracted with two 100 ml. portions of methylene chloride. The combined organic layers were washed with 5% potassium bicarbonate solution until neutral, then with water and finally dried over anhydrous sodium sulfate. The solvent was removed in vacuo to leave the desired product as a residue.

EXAMPLE XXV

5α-Bromo-6β-Fluoro-21-Methyl-Pregnane-3β,17α-Diol-20-One

A total of 0.5 mole of 21-methyl-$\Delta^5$-pregnene-3β,17α-diol-20-one in 300 ml. of methylene chloride was cooled to −80° C. To this mixture, there was added 0.52 mole of N-bromoacetamide and 12.5 moles of anhydrous hydrogen fluoride in 300 ml. of a tetrahydrofuran-methylene chloride solvent mixture containing 120 ml. of tetrahydrofuran. The solvent system of the final reaction mixture contained 20% tetrahydrofuran. The mixture was maintained at −80° C. for 16 hours and the product isolated as described in Example XXIV.

EXAMPLE XXVI

5α-Bromo-6β-Fluoro-Pregnane-3β,17α-Diol-20-One

A total of 0.5 mole of $\Delta^5$-pregnene-3β,17α-diol-20-one was taken up in 300 ml. of methylene chloride at −50° C. To this mixture, there was added 0.75 mole of N-bromoacetamide in 50 moles of anhydrous hydrogen fluoride in 300 ml. of tetrahydrofuran-methylene chloride solvent mixture containing 240 ml. of tetrahydrofuran. The solvent system of the final reaction mixture contained 40% tetrahydrofuran. The mixture was maintained at −50° C. for 1 hour and the product isolated as described in Example XXIV.

EXAMPLE XXVII

5α-Bromo-6β-Fluoro-21-Methyl-Pregnane-3β,17α-Diol-20-One

A total of 0.5 mole of 21-methyl-$\Delta^5$-pregnene-3β,17α-diol-20-one in 300 ml. of chloroform was cooled to −80° C. To this mixture, there was added 0.52 mole of N-bromoacetamide and 12.5 moles of anhydrous hydrogen fluoride in 300 ml. of a dioxane-chloroform solvent mixture containing 120 ml. of dioxane. The solvent system of the final reaction mixture contained 20% dioxane. The mixture was maintained at −80° C. for 16 hours and the product isolated as described in Example XXIV.

EXAMPLE XXVIII

5α-Bromo-6β-Fluoro-Pregnane-3β,17α-Diol-20-One

A total of 0.5 mole of $\Delta^5$-pregnene-3β,17α-diol-20-one was taken up in 300 ml. of chloroform at −50° C. To this mixture, there was added 0.75 mole of N-bromoacetamide and 50 moles of anhydrous hydrogen fluoride in 300 ml. of dioxane-chloroform solvent mixture containing 240 ml. of dioxane. The solvent system of the final reaction mixture contained 40% dioxane. The mixture was maintained at −50° C. for 1 hour and the product isolated as described in Example XXIV.

EXAMPLE XXIX

5α-Bromo-6β-Fluoro-21-Methyl-Pregnane-17α-Ol-3,20-Dione

A total of 20 grams of 5α-bromo-6β-fluoro-21-methyl-pregnane-3β,17α-diol-20-one in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the ketone. The ketone was collected by filtration, washed with water and air-dried. An additional portion of the desired product was isolated by extracting the aqueous filtrate with chloroform, drying the organic layer over anhydrous sodium sulfate, filtering and evaporating the solvent in vacuo.

EXAMPLE XXX

5α-Bromo-6β-Fluoro-Pregnane-17α-Ol-3,20-Dione

To a solution of 5 grams of 5α-bromo-6β-fluoro-pregnane-3β,17α-diol-20-one in 25 ml. of gracial acetic acid, there was added 15 ml. of a solution of chromium trioxide in 9:1 acetic acid-water solution containing 76 mg. of chromium trioxide per ml. of solution. The mixture was kept at room temperature during the addition and for an additional 4 hours. The desired product was precipitated by the addition of water and collected by filtration.

EXAMPLE XXXI

5α-Bromo-6β-Fluoro-21-Methyl-Pregnane-17α-Ol-3,20-Dione

Chromic anhydride (0.125 gram) was added to 15 ml. of pyridine at approximately 5° C. and the mixture allowed to warm spontaneously to room temperature. To this solution, there was added 2.5 grams of 5α-bromo-6β-fluoro-21-methyl-pregnane-3β,17α-diol-20-one in 20 ml. of pyridine and the mixture was allowed to stand at room temperature for 25 hours. The solution was extracted with ether and the ether solution washed twice with 5% aqueous hydrochloric acid and then with water. The ether layer was dried over anhydrous sodium sulfate, filtered and the desired product obtained by removal of the ether in vacuo.

EXAMPLE XXXII

5α-Bromo-6β-Fluoro-Pregnane-17α-Ol-3,20-Dione

A solution of 0.5 gram of sodium dichromate dihydrate in 10 ml. of glacial acetic acid was added over a 30-minute period to 0.25 gram of 5α-bromo-6β-fluoro-pregnane-3β,17α-diol-20-one in 50 ml. of 1:1 glacial acetic acid-benzene at 10° C. After 1 hour, an additional 0.3 gram of oxidizing agent in 7 ml. of solvent was added and the mixture left standing for 24 hours at 10° C. It was poured into cold aqueous sodium bisulfite solution and the solution extracted with ether. The organic layer was washed with water until the washings were neutral, dried over anhydrous sodium sulfate, filtered and the ether removed in vacuo to isolate the desired product.

EXAMPLE XXXIII $\Delta^4$-Pregnene-17α-Ol-3,20-Dione

A total of 20 grams of $\Delta^5$-pregnene-3β,17α-diol-20-one in 1500 ml. of acetone at 10° C. was treated with 30 ml. of 8 N chromic acid reagent added in one portion with vigorous stirring. After 5 minutes the reaction temperature rose to 22° C. and the entire mixture was poured into 10 liters of water which caused precipitation of the 3-keto-$\Delta^5$-compound. The ketone was collected by filtration, washed with water and air-dried. The product was taken up in acetic acid containing 2% by volume of sulfuric acid and the mixture maintained at approximately 25 to 30° C. for 5 hours. This treatment effected the isomerization of the double bond at the 5-position, to produce the desired 3-keto-$\Delta^4$-compound which was precipitated by the addition of water and collected by filtration.

EXAMPLE XXXIV

21-Methyl-$\Delta^4$-Pregnene-17α-Ol-3,20-Dione

A total of 20 grams of 21-methyl-$\Delta^5$-pregnene-3β,17α-diol-20-one in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the 3-keto-$\Delta^5$-compound. This compound was isomerized to the desired 3-keto-$\Delta^4$-compound and the latter compound was isolated in accordance with the procedure of the foregoing example.

EXAMPLE XXXV

6β-Fluoro-21-Methyl-$\Delta^5$-Pregnene-17α-Ol-3,20-Dione

A mixture containing 50 grams of 5α-bromo-6β-fluoro-21-methyl-pregnane-17α-ol-3,20-dione and an equimolar portion of anhydrous sodium acetate was refluxed for 40 minutes in 1500 ml. of ethanol. The mixture was then poured into 8 liters of water and the desired product which precipitated was collected by filtration.

EXAMPLE XXXVI

6β-Fluoro-$\Delta^4$-Pregnene-17α-Ol-3,20-Dione

A mixture containing 50 grams of 5α-bromo-6β-fluoro-pregnane-17α-ol-3,20-dione together with a 200% molar excess of sodium propionate in 1500 ml. of ethyl acetate was refluxed for 4 hours. The solvent was then removed by distillation in vacuo and the residue washed with water to leave the desired product.

EXAMPLE XXXVII

6β-Fluoro-21-Methyl-$\Delta^4$-Pregnene-17α-Ol-3,20-Dione

A mixture of 50 grams of 5α-bromo-6β-fluoro-21-methyl-pregnane-17α-ol-3,20-dione and a 100% molar excess of potassium acetate in 1500 ml. of di-n-butyl ketone was maintained at 130° C. for one-half hour. The solvent was removed in vacuo and the residue washed with water to leave the desired product.

EXAMPLE XXXVIII

6β-Fluoro-$\Delta^4$-Pregnene-17α-Ol-3,20-Dione

A mixture containing 50 grams of 5α-bromo-6β-fluoro-pregnane-17α-ol-3,20-dione together with a 100% excess of sodium carbonate in 1500 ml. of acetone was refluxed for 2 hours. The mixture was then poured into 8 liters of water and the desired product which precipitated was collected by filtration.

EXAMPLE XXXIX

6β-Fluoro-21-Methyl-$\Delta^4$-Pregnene-17α-Ol-3,20-Dione

A mixture containing 50 grams of 5α-bromo-6β-fluoro-21-methyl-pregnane-17α-ol-3,20-dione together with a 40% molar excess of sodium bicarbonate was maintained at 50° C. in 1500 ml. of ethanol for 4 hours. The mixture was then poured into 8 liters of water and the desired product which precipitated was collected by filtration.

EXAMPLE XL

6β-Fluoro-21-Methyl-$\Delta^4$-Pregnene-11α,17α-Diol-3,20-Dione

A culture of *Rhizopus nigricans* Ehrb. ATCC 6227b was propagated on an agar nutrient medium. The organism was rinsed from the agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water adjusted to pH 7.0 with potassium hydroxide.

One hundred ml. of this medium were used in each of several 300 ml. flasks. To each flask was added 50 mg. of 6β-fluoro-21-methyl-Δ⁴-pregnene-17α-ol-3,20-dione dissolved in a small volume of acetone. Throughout these operations, the fermentation mixture was maintained under aseptic conditions. The mixture was shaken for a period of seven days at a temperature of about 28° C. The contents of the flasks were combined and extracted with several portions of methylene chloride using ⅕ the volume of aqueous phase each time. The combine methylene chloride extracts were dried over anhydrous sodium sulfate and after the drying agent was removed, the solution was concentrated to a volume of approximately 2 ml. The concentrate was placed on a chromatographic column consisting of silica gel mixed with a small volume of ethanol (1 ml. of solvent per gram of silica gel). The column was developed by means of a mixture of 97 volumes of methylene chloride and 3 volumes of 95% ethanol. The effluent from the column was collected in small fractions of equal volume and periodically these were examined by means of paper chromatography in order to separate the fractions containing the desired product. All of these fractions were combined and concentrated in vacuo to dryness to obtain the desired product.

EXAMPLE XLI

*21-Methyl-Δ⁴-Pregnene-11α,17α-Diol-3,20-Dione*

This compound was prepared from 21-methyl-Δ⁴-pregnene-17α-ol-3,20-dione using *Rhizopus nigricans* Ehrb. ATCC 6227b in accordance with the procedure of Example XL.

EXAMPLE XLII

*6β-Fluoro-21-Methyl-Δ⁴-Pregnene-11β,17α-Diol-3,20-Dione*

This compound was prepared from 6β-fluoro-21-methyl-Δ⁴-pregnene-17α-ol-3,20-dione using *Curvularia lunata* NRRL 2380 in accordance with the procedure of Example XL.

EXAMPLE XLIII

*21-Methyl-Δ⁴-Pregnene-11β,17α-Diol-3,20-Dione*

This compound was prepared from 21-methyl-Δ⁴-pregnene-17α-ol-3,20-dione using *Curvularia lunata* NRRL 2380 in accordance with the procedure of Example XL.

EXAMPLE XLIV

*6β-Fluoro-Δ⁴-Pregnene-11α,17α-Diol-3,20-Dione*

This compound was prepared from 6β-fluoro-Δ⁴-pregnene-17α-ol-3,20-dione using *Rhizopus nigricans* Ehrb. ATCC 6227b in accordance with the procedure of Example XL.

EXAMPLE XLV

*Δ⁴-Pregnene-11α,17α-Diol-3,20-Dione*

This compound was prepared from Δ⁴-pregnene-17α-ol-3,20-dione using *Rhizopus nigricans* Ehrb. ATCC 6227b in accordance with the procedure of Example XL.

EXAMPLE XLVI

*6β-Fluoro-Δ⁴-Pregnene-11β,17α-Diol-3,20-Dione*

This compound was prepared from 6β-fluoro-Δ⁴-pregnene-17α-ol-3,20-dione using *Chaetomella oblonga* ATCC 12718, in accordance with the procedure of Example XL.

EXAMPLE XLVII

*Δ⁴-Pregnene-11β,17α-Diol-3,20-Dione*

This compound was prepared from Δ⁴-pregnene-17α-ol-3,20-dione using *Spondylocladium australe* ATCC 12728, in accordance with the procedure of Example XL.

EXAMPLE XLVIII

*6β-Fluoro-21-Methyl-Δ⁴-Pregnene-11β,17α-Diol-3,20-Dione*

This compound was prepared from 6β-fluoro-Δ⁴-pregnene-17α-ol-3,20-dione using *Epicoccum oryzae* ATCC 12724 in accordance with the procedure of Example XL.

EXAMPLE XLIX

*6β-Fluoro-21-Methyl-Δ⁴-Pregnene-11α,17α-Diol-3,20-Dione-11-Tosylate*

A total of 19 grams of 6β-fluoro-21-methyl-Δ⁴-pregnene-11α,17α-diol-3,20-dione was taken up in 300 ml. of pyridine containing 37 grams of p-toluenesulfonyl chloride and maintained at a temperature of from about 25 to 30° C. for 60 hours. A mixture of 200 grams of crushed ice in 1200 ml. of water was then added with vigorous stirring and after 10 minutes, the solids were collected and the precipitate retained. The solids were well washed with 0.25 N hydrochloric acid and then with water and finally slurried for 30 minutes with water. The desired product was recovered by filtration and air-dried.

EXAMPLE L

*21-Methyl-Δ⁴-Pregnene-11α,17α-3,20-Dione-11-Tosylate*

A total of 19 grams of 21-methyl-Δ⁴-pregnene-11α,17α-diol-3,20-dione was taken up in 300 ml. of chloroform containing a molar equivalent of pyridine and a molar equivalent of p-toluenesulfonyl chloride was added dropwise while maintaining the temperature at 0° C. The mixture was allowed to stand for 60 hours and then a mixture of 200 grams of crushed ice in 1200 ml. of water was added with vigorous stirring. The mixture was extracted with chloroform and the chloroform solution washed first with cold dilute hydrochloric acid, then with dilute sodium bicarbonate and finally with water. It was dried over sodium sulfate, filtered and the solvent removed in vacuo to leave the desired product as a residue.

EXAMPLE LI

*6β-Fluoro-21-Methyl-Δ⁴-Pregnene-11α,17α-Diol-3,20-Dione-11-Mesylate*

A total of 10 grams of 6β-fluoro-21-methyl-Δ⁴-pregnene-11α,17α-diol-3,20-dione in 400 ml. of chlorobenzene containing a 40% molar excess of pyridine and a 40% excess of methanesulfonyl chloride in 150 ml. of chlorobenzene was added dropwise. The mixture was maintained at approximately 0° C. for 8 hours and quenched in a mixture of ice and water as described above. The desired product was isolated from a methylene chloride extract using the procedure described in Example L.

EXAMPLE LII

*21-Methyl-Δ⁴-Pregnene-11α,17α-3,20-Dione-11-Mesylate*

A total of 10 grams of 21-methyl-Δ⁴-pregnene-11α,17α-diol-3,20-dione in 400 ml. of benzene containing a 40% molar excess of N-methyl piperidine and a 40% excess of methanesulfonyl chloride in 150 ml. of benzene was added dropwise. The mixture was maintained at approximately 0° C. for 50 hours and quenched in a mixture of ice and water as described above. The desired product was isolated from an ethylene chloride extract using the procedure described in Example L.

EXAMPLE LIII

6β-Fluoro-Δ⁴-Pregnene-11α,17α-Diol-3,20-Dione-11-p-Bromosulfonate

A total of 10 grams of 6β-fluoro-Δ⁴-pregnene-11α,17α-diol-3,20-dione in 400 ml. of carbon tetrachloride containing a 10% molar excess of pyridine and a 40% excess of p-bromosulfonyl chloride in 150 ml. of carbon tetrachloride was added dropwise. The mixture was maintained at approximately 40° C. for 8 hours and quenched in a mixture of ice and water as described above. The desired product was isolated from a carbon tetrachloride extract using the procedure described in Example L.

EXAMPLE LIV

Δ⁴-Pregnene-11α,17α-Diol-3,20-Dione 11-Ethane Sulfonate

A total of 10 grams of Δ⁴-pregnene-11α,17α-diol-3,20-dione in 400 ml. of chlorobenzene containing a 40% molar excess of dimethyl aniline and a 40% excess of ethanesulfonyl chloride in 150 ml. of chlorobenzene was added dropwise. The mixture was maintained at approximately 0° C. for 8 hours and quenched in a mixture of ice and water as described above. The desired product was isolated from a methylene chloride extract using the procedure described in Example L.

EXAMPLE LV

6β-Fluoro-Δ⁴-Pregnene-11α,17α-Diol-3,20-Dione 11-Tosylate

A total of 19 grams of 6β-fluoro-Δ⁴-pregnene-11α,17α-diol-3,20-dione was taken up in 300 ml. of pyridine containing 37 grams of p-toluenesulfonyl chloride and maintained at a temperature of from about 25 to 30° C. for 60 hours. A mixture of 200 grams of crushed ice in 1200 ml. of water was then added with vigorous stirring and after 10 minutes, the solids were collected and the precipitate retained. The solids were well washed with 0.25 N hydrochloric acid and then with water and finally slurried for 30 minutes with water. The desired product was recovered by filtration and air-dried.

EXAMPLE LVI

Δ⁴-Pregnene-11α,17α-Diol-3,20-Dione 11-Tosylate

A total of 19 grams of Δ⁴-pregnene-11α,17α-diol-3,20-dione was taken up in 300 ml. of pyridine containing 37 grams of p-toluenesulfonyl chloride and maintained at a temperature of from about 25 to 30° C. for 60 hours. A mixture of 200 grams of crushed ice in 1200 ml. of water was then added with vigorous stirring and after 10 minutes, the solids were collected and the precipitate retained. The solids were well washed with 0.25 N hydrochloric acid and then with water and finally slurried for 30 minutes with water. The desired product was recovered by filtration and air-dried.

EXAMPLE LVII

6β-Fluoro-21-Methyl-Δ$^{4,9(11)}$-Pregnadiene-17α-Ol-3,20-Dione

A total of 4.8 grams of 6β-fluoro-21-methyl-Δ⁴-pregnene-11α,17α-diol-3,20-dione 11-tosylate was taken up in 125 ml. of acetic acid containing 6.5 grams of sodium acetate and the resulting mixture was refluxed for 45 minutes. After cooling, 600 ml. of water was added and the desired product precipitated. It was collected by filtration.

EXAMPLE LVIII

21-Methyl-Δ$^{4,9,(11)}$-Pregnadiene-17α-Ol-3,20-Dione

A total of 5 grams of 21-methyl-Δ⁴-pregnene-11α,17α-diol-3,20-dione 11-mesylate was taken up in 125 ml. of propionic acid containing an equimolar portion of sodium propionate and the mixture was refluxed for 10 minutes. After cooling, water was added and the desired product precipitated. It was collected by filtration.

EXAMPLE LIX

6β-Fluoro-Δ$^{4,9(11)}$-Pregnadiene-17α-Ol-3,20-Dione

A total of 10 grams of 6β-fluoro-Δ⁴-pregnene-11α,17α-diol-3,20-dione 11-tosylate was taken up in 125 ml. of N,N-dimethyl formamide containing a 700% molar excess of anhydrous sodium butyrate and maintained at 140° C. for 4 hours. After cooling, the desired product was precipitated by the addition of water and was collected by filtration.

EXAMPLE LX

Δ$^{4,9(11)}$-Pregnadiene-17α-Ol-3,20-Dione

A total of 5 grams of Δ⁴-pregnene-11α,17α-diol-3,20-dione 11-p-bromosulfonate was taken up in 125 ml. of acetic acid and refluxed for 10 hours. Most of the acetic acid was removed by distillation in vacuo and the residue was taken up in chloroform and extracted with water. The organic layer was washed with dilute sodium bicarbonate and again with water. It was dried over anhydrous sodium sulfate, filtered and the desired product obtained by evaporation of the solvent in vacuo.

EXAMPLE LXI

6β-Fluoro-21-Methyl-Δ$^{4,9(11)}$-Pregnadiene-17α-Ol-3,20-Dione

A total of 5 grams of 6β-fluoro-21-methyl-Δ⁴-pregnene-11α,17α-diol-3,20-dione 11-mesylate was taken up in 125 ml. of acetic acid and the reaction mixture maintained at 30° C. for 16 hours. The desired product was precipitated by the addition of water and collected by filtration.

EXAMPLE LXII

21-Methyl-Δ$^{4,9(11)}$-Pregnadiene-17α-Ol-3,20-Dione

A solution containing 5 grams of 21-methyl-Δ⁴-pregnene-11β,17α-diol-3,20-dione in 25 ml. of N,N-dimethyl formamide was prepared. The solution was placed in a three-necked flask to which was affixed a sealed stirrer, dropping funnel and a condenser. The condenser and dropping funnel was protected with drying tubes. The mixture was cooled to −20° C. and a solution containing 4.5 ml. of methanesulfonyl chloride in 5 ml. of pyridine was added dropwise over a period of 1 hour with continued stirring. At the end of the hour, stirring was stopped, the reaction mixture allowed to come to room temperature, i.e. 25 to 30° C., and left standing for 10 hours. At the end of this period, the solution was added dropwise to 750 ml. of ice cold water with stirring. The desired product precipitated and was recovered by filtration.

EXAMPLE LXIII

6α-Fluoro-21-Methyl-Δ$^{4,9(11)}$-Pregnadiene-17α-Ol-3,20-Dione

A stream of anhydrous hydrogen chloride was bubbled for about 3 hours into a solution of 10 grams of 6β-fluoro-21-methyl-Δ$^{4,9(11)}$-pregnadiene-17α-ol-3,20-dione in 850 ml. of chloroform and 7 ml. of absolute ethanol. The temperature was maintained at −5° C. during the addition. At the end of this period, the solution was diluted with 1500 ml. of chloroform and washed successively with sodium carbonate and water. It was dried over anhydrous sodium sulfate, filtered and the desired product obtained by removal of the solvent in vacuo.

EXAMPLE LXIV

6α-Fluoro-Δ$^{4,9(11)}$-Pregnadiene-17α-Ol-3,20-Dione

A total of 1 gram of 6β-fluoro-Δ$^{4,9(11)}$-pregnadiene-17α-ol-3,20-dione in 100 ml. of methylene chloride was treated with dry hydrogen bromide at 10° C. for 2½ hours. The solution was washed with water, dilute sodium carbonate and again with water. The organic layer was dried over anhydrous magnesium sulfate and the desired product obtained by removing the solvent in vacuo.

EXAMPLE LXV $6\alpha$-Fluoro-21-Methyl-$\Delta^{4,9(11)}$-Pregnadiene-17-Ol-3,20-Dione A total of 10 grams of $6\beta$-fluoro-21-methyl-$\Delta^{4,9(11)}$-pregnadiene-17$\alpha$-ol-3,20-dione was taken up in 1500 ml. of acetic acid containing 200 ml. of sulfuric acid. The reaction mixture was maintained at $-5°$ C. for 4 hours. The mixture was cautiously added to two liters of water containing 500 grams of crushed ice. External cooling was necessary to maintain the temperature below 15° C. The resulting mixture was extracted with ethylene chloride. The organic layer was washed with water and then with sodium bicarbonate until neutral. It was washed again with water, dried over anhydrous magnesium sulfate, filtered and the desired product was recovered by removal of the solvent in vacuo.

EXAMPLE LXVI $6\alpha$-Fluoro-21-Methyl-$\Delta^{4,9(11)}$-Pregnadiene-17-Ol-3,20 Dione A total of 25 grams of $6$-$\beta$-fluoro-21-methyl-$\Delta^{4,9(11)}$-pregnadiene-17$\alpha$-ol-3,20-dione was taken up in 1500 ml. of ethylene chloride containing 150 ml. of propanol. The solution was cooled to 10° C. and anhydrous hydrogen chloride was bubbled into the mixture for two hours. The mixture was then washed with water and then with dilute sodium bicarbonate until neutral. It was washed again with water, separated, dried over anhydrous sodium sulfate, filtered and the desired product was recovered by removal of the solvent in vacuo.

EXAMPLE LXVII $6\alpha$-Fluoro-$\Delta^{4,9(11)}$-Pregnadiene-17$\alpha$-Ol-3,20-Dione A total of 10 grams of $6\beta$-fluoro-$\Delta^{4,9(11)}$-pregnadiene-17$\alpha$-ol-3,20-dione was taken up in 800 ml. of ethanol and cooled to $-5°$ C. Anhydrous hydrogen chloride was bubbled through the mixture for 4 hours, at this temperature. The solvent was removed in vacuo and the residue taken up in chloroform. The chloroform solution was washed with water, dilute sodium bicarbonate and again with water. It was dried over anhydrous magnesium sulfate, filtered and the desired product recovered by the removal of the solvent in vacuo.

EXAMPLE LXVIII $6\alpha$-Fluoro-21-Methyl-$\Delta^{1,4,9(11)}$-Pregnatriene-17$\alpha$-Ol-3,20-Dione A mixture of 0.8 gram of $6\alpha$-fluoro-21-methyl-$\Delta^{4,9(11)}$-pregnadiene-17$\alpha$-ol-3,20-dione and 0.8 gram of freshly sublimed selenium dioxide in 10 ml. of tert-butanol was heated in a nitrogen atmosphere for 10½ hours at 175° C. The solution was filtered and the desired product precipitated by the addition of water. It was isolated by filtration.

EXAMPLE LXIX

21-Methyl-$\Delta^{1,4,9(11)}$-Pregnatriene-17$\alpha$-Ol-3,20-Dione

A mixture containing 0.3 gram of 21-methyl-$\Delta^{4,9(11)}$-pregnadiene-17$\alpha$-ol-3,20-dione and 0.3 ml. of glacial acetic acid in 30 ml. of tert-butanol was prepared. To this mixture there was added 0.2 gram of selenium dioxide and the mixture was refluxed in a nitrogen atmosphere for 3 hours. An additional 0.1 gram of selenium dioxide was added and refluxing was continued for 4 more hours. The mixture was filtered and the filtrate evaporated to dryness in vacuo. The residue was taken up in 25 ml. of ethyl acetate and washed with one 5 ml. portion of water, twice with 5 ml. portions of 5% aqueous potassium bicarbonate, once with 5 ml. of water, twice with 5 ml. portions of ice cold 15% ammonium sulfide, once with 5 ml. of cold 2 N ammonium hydroxide, once with 5 ml. of water, once with 5 ml. of 2 N hydrochloric acid and finally twice with 5 ml. portions of water. The layers were separated and the organic layer dried over anhydrous sodium sulfate, filtered and evaporated to dryness in vacuo. The residue was triturated with ether and dried in vacuo to obtain the desired product.

EXAMPLE LXX $6\alpha$-Fluoro-$\Delta^{1,4,9(11)}$-Pregnatriene-17$\alpha$-Ol-3,20-Dione A mixture of 1.55 grams of $6\alpha$-fluoro-$\Delta^{4,9(11)}$-pregnadiene-17$\alpha$-ol-3,20-dione in 150 ml. of phenetole containing one molar equivalent of selenium dioxide was refluxed for 1 hour. The mixture was cooled and extracted with chloroform. It was filtered through a filter aid and the solvents removed in vacuo. The product was chromatographed on a column of florisil to obtain the purified products. Selected fractions of the eluate were evaporated to obtain crystals. The crystalline product was triturated with ethyl acetate and dried.

EXAMPLE LXXI $\Delta^{1,4,9(11)}$-Pregnatriene-17$\alpha$-Ol-3,20-Dione

A total of 10 grams of $\Delta^{4,9(11)}$-pregnadiene-17$\alpha$-ol-3,20-dione in 300 ml. of dibutyl Cellosolve containing 5 molar equivalents of selenium dioxide was maintained at 175° C. for 1 hour. The product was recovered from the reaction mixture as described in the previous example.

EXAMPLE LXXII $6\alpha$-Fluoro-21-Methyl-$\Delta^{1,4,9(11)}$-Pregnatriene-17$\alpha$-Ol-3,20-Dione A mixture containing 10 grams of $6\alpha$-fluoro-21-methyl-$\Delta^{4,9(11)}$-pregnadiene-17$\alpha$-ol-3,20-dione and 10 molar equivalents of selenium dioxide was refluxed in tert-butanol for 100 hours. The mixture was filtered and the desired product recovered by removal of the solvent in vacuo.

EXAMPLE LXXIII

21-Methyl-$\Delta^{1,4,9(11)}$-Pregnatriene-17$\alpha$-Ol-3,20-Dione

A mixture containing 10 grams of 21-methyl-$\Delta^{4,9(11)}$-pregnatriene-17$\alpha$-ol-3,20-dione in 200 ml. of xylene containing 5 molar equivalents of selenium dioxide under 3 atmospheres of nitrogen was maintained at 200° C. for 1 hour. The solvent was removed in vacuo and the residue taken up in chloroform. The solution was purified and isolated as described in Example LXVIII.

EXAMPLE LXXIV $6\alpha$-Fluoro-21-Methyl-$\Delta^{1,4,9(11)}$-Pregnatriene-17$\alpha$-Ol-3,20-Dione Mycobacterium phlei ATCC 354 was transferred from a nutrient agar slant to a Fernbach flask containing 1000 ml. of the following medium:

Nutrient broth (Difco) _____ grams__ 8.0
Glycerol _____ ml__ 20
Tween 80 (Atlas Powder Company) _____ ml__ 0.2
Distilled water to make 1000 ml.

After two days of shaking at 28° C., 100 ml. of the resulting broth was used to inoculate each of four fermentors containing 2000 ml. of the following medium:

|  | Grams |
|---|---|
| Ammonium nitrite | 1.0 |
| Potassium acid phosphate | 0.25 |
| Magnesium sulfate heptahydrate | 0.25 |
| Sodium chloride | 0.005 |
| Ferrous sulfate heptahydrate | 0.0001 |
| Calcium carbonate | 5.0 |

Distilled water to make 1000 ml.

At the same time the fermentors were inoculated, 250 mg. of $6\alpha$-fluoro-21-methyl-$\Delta^{4,9(11)}$-pregnadiene-17$\alpha$-ol- 3,20-dione was added to each vessel. After 24 hours, the fermentations were stopped, the broth combined and extracted with chloroform. The solvent was removed from the chloroform solution to leave the desired product as a residue.

EXAMPLE LXXV

*21-Methyl-$\Delta^{1,4,9(11)}$-Pregnatriene-17α-Ol-3,20-Dione*

To a four liter Pyrex glass vessel equipped for conducting submerged aerated fermentation, there was added two liters of the following medium:

| | Grams |
|---|---|
| N-Z Amine B (trademark, Sheffield Farms, casein hydrolysate) | 10 |
| Dextrose hydrate | 10 |
| Yeast extract | 5 |
| Calcium carbonate | 1 |
| Tap water to make one liter. | |

The aqueous mixture was sterilized and 0.25 gram of 21-methyl-$\Delta^{4,9(11)}$-pregnadiene-17α-ol-3,20-dione was added. The mixture was then seeded with 100 ml. of a culture of *Nocardia opaca* ATCC 4276 grown in a shake flask on a nutrient broth. The mixture was agitated and aerated with sterile air. The whole mixture was then extracted several times with chloroform. The combined extracts were applied to a silica gel chromatography column which was eluted with mixtures of methylene chloride and ethanol. The combined fractions containing the desired product were evaporated to isolate 21-methyl-$\Delta^{1,4,9(11)}$-pregnatriene-17α-ol-3,20-dione.

EXAMPLE LXXVI

*6α-Fluoro-$\Delta^{1,4,9(11)}$-Pregnatriene-17α-Ol-3,20-Dione*

A mixture containing 6α-fluoro-$\Delta^{4,9(11)}$-pregnadiene-17α-ol-3,20-dione dissolved in methanol was added to shake flasks containing a 24 hour culture of *Corynebacterium simplex* in a nutrient medium of 0.1% Difco yeast extract buffered at pH 7. The mixture was shaken at 28° C. for 24 hours. The whole broth was then extracted with ethylene chloride and the desired product isolated by evaporation of the solvent.

EXAMPLE LXXVII

*6α-Fluoro-21-Iodo-21-Methyl-$\Delta^{4,9(11)}$-Pregnadiene-17α-Ol-3,20-Dione*

A total of 0.1 gram of 6α-fluoro-21-methyl-$\Delta^{4,9(11)}$-pregnadiene-17α-ol-3,20-dione was dissolved in 0.9 ml. of absolute methanol and 1.8 ml. of tetrahydrofurane containing tertiary butyl hydroperoxide in a quantity equivalent to 0.006 gram of iodine per ml. of tetrahydrofuran. The air was displaced by nitrogen and 4 molar equivalents of calcium oxide and 1.5 molar equivalents of finely powdered iodine was added. The reaction flask was stoppered and stirred magnetically at 20° C. for 5 hours. The mixture was then poured into 50 ml. of cold dilute aqueous sodium thiosulfate containing 1% by volume of glacial acetic acid. It was stirred for 15 minutes and filtered to yield the desired product.

EXAMPLE LXXVIII

*6α-Fluoro-21-Iodo-21-Methyl-$\Delta^{1,4,9(11)}$-Pregnatriene-17α-Ol-3,20-Dione*

A total of 1 gram of 6α-fluoro-21-methyl-$\Delta^{1,4,9(11)}$-pregnatriene-17α-ol-3,20-dione was dissolved in 9 ml. of absolute ethanol and 18 cc. of tetrahydrofuran containing 0.018 gram of iodine per ml. of tetrahydrofuran. To this mixture, there was added 6 molar equivalents of calcium oxide and 2 molar equivalents of iodine. The reaction flask was stoppered and stirred magnetically at 40° C. for 2 hours. The mixture was then poured into 500 ml. of cold dilute aqueous sodium thiosulfate containing 10% by volume of glacial acetic acid. It was stirred at 5° C. for 2 hours and the product recovered by filtration.

EXAMPLE LXXIX

*21-Iodo-21-Methyl-$\Delta^{4,9,(11)}$-Pregnadiene-17α-Ol-3,20-Dione*

A total of 0.15 gram of 21-methyl-$\Delta^{4,9(11)}$-pregnadiene-17α-ol-3,20-dione was dissolved in 1.35 ml. of propanol and 2.7 ml. of tetrahydrofuran containing tertiary butyl hydroperoxide in a quantity equivalent to 0.012 gram of iodine per ml. of tetrahydrofuran. The air was displaced by nitrogen and 5 molar equivalents of calcium oxide and 1.75 molar equivalents of finely powdered iodine was added. The reaction flask was stoppered and stirred magnetically at 30° C. for 3 hours. The mixture was then poured into 200 ml. of water and sufficient solid sodium thiosulfate was added to decompose the excess iodine. The mixture was stirred vigorously for 5 minutes and the product recovered by filtration.

EXAMPLE LXXX

*21-Iodo-21-Methyl-$\Delta^{1,4,9(11)}$-Pregnatriene-17α-Ol-3,20-Dione*

A total of 0.15 gram of 21-methyl-$\Delta^{1,4,9(11)}$-pregnatriene117α-ol-3,20-dione was dissolved in 1.35 ml. of propanol and 2.7 ml. of tetrahydrofuran containing tertiary butyl hydroperoxide in a quantity equivalent to 0.012 gram of iodine per ml. of tetrahydrofuran. The air was displaced by nitrogen and 5 molar equivalents of calcium oxide and 1.75 molar equivalents of finely powdered iodine was added. The reaction flask was stoppered and stirred magnetically at 30° C. for 3 hours. The mixture was then poured into 200 ml. of water and sufficient solid sodium thiosulfate was added to decompose the excess iodine. The mixture was stirred vigorously for 5 minutes and the product recovered by filtration.

EXAMPLE LXXXI

*6α-Fluoro-21-Methyl-$\Delta^{4,9(11)}$-Pregnadiene-17α,21-Diol-3,20-Dione 21-Acetate*

A mixture containing 10 grams of potassium bicarbonate and an equimolar portion of acetic acid in 1 liter of acetone was prepared. To this mixture, there was added 7.3 grams of 6α-fluoro-21-iodo-21-methyl-$\Delta^{4,9(11)}$-pregnadiene-17α-ol-3,20-dione in 3.6 liters of acetone. The mixture was refluxed for 16 hours and concentrated to a volume of approximately 100 ml. in vacuo. To the concentrate, there was added 275 ml. of water and the resulting solution was extracted three times with 300 ml. portions of chloroform. The combined chloroform extracts were washed successively with one 200 ml. portion of water, one 200 ml. portion of aqueous sodium bicarbonate and finally with a 200 ml. portion of water. The organic layer was separated, dried over magnesium sulfate, filtered and the desired product obtained by removal of the solvent in vacuo.

This procedure was also used to prepare the formate, propionate, butyrate and valerate esters of this compound.

EXAMPLE LXXXII

*6α-Fluoro-21-Methyl-$\Delta^{1,4,9(11)}$-Pregnatriene-17α,21-Diol-3,20-Dione 21-Acetate*

A solution containing 20 grams of 6α-fluoro-21-iodo-21-methyl-$\Delta^{1,4,9(11)}$-pregnatriene-17α-ol-3,20-dione in 200 ml. of acetone was prepared and a 2000% molar excess of potassium acetate was added. The mixture was maintained at 56° C. for 24 hours and the solvent removed in vacuo. The residue was washed with water, filtered and dried to yield the desired product.

The formate, propionate, butyrate, isobutyrate and valerate were similarly prepared.

EXAMPLE LXXXIII

*21-Methyl-$\Delta^{4,9(11)}$-Pregnadiene-17α,21-Diol-3,20-Dione 21-Acetate*

A solution containing 20 grams of 21-iodo-21-methyl- $\Delta^{4,9(11)}$-pregnadiene-17α-ol-3,20-dione 21-acetate in 200 ml. of dimethyl formamide was prepared and 200% molar excess of sodium acetate was added. The mixture was maintained at 100° C. for 4 hours and the solvent removed in vacuo. The residue was washed with water, filtered and dried to yield the desired product.

EXAMPLE LXXXIV

*6α-Fluoro-9α-Bromo-21-Methyl-$\Delta^{1,4}$-Pregnadiene-11β,17α,21-Triol-3,20-Dione 21-Acetate*

To a suspension of 2.5 grams of 6α-fluoro-21-methyl-$\Delta^{1,4,9(11)}$-pregnatriene-17α,21-diol-3,20-dione 21-acetate in 125 ml. of peroxide-free dioxane and 2 ml. of 0.46 N perchloric acid, there was added in the dark at 20° C. with stirring over a one-hour period, 570 mg. of solid N-bromoacetamide. At the end of 1 hour, all of the starting material had dissolved and 12.5 ml. of dilute aqueous sodium sulfite solution was added with stirring. A few grams of ice in 20 ml. of chloroform was added and the layers separated. The organic layer was washed twice with water while maintaining the temperature at about 20° C. by the occasional addition of ice. The organic solution was concentrated in vacuo and acetone was added. The mixture was maintained at a temperature of about 5° C. until crystals had formed, and the desired product was recovered by filtration.

EXAMPLE LXXXV

*6α-Fluoro-9α-Bromo-21-Methyl-$\Delta^4$-Pregnene-11β,17α-21-Triol-3,20-Dione 21-Acetate*

To a suspension of 2 grams of 6α-fluoro-21-methyl-$\Delta^{4,9(11)}$-pregnadiene-17α,21-diol-3,20-dione 21-acetate in 75 ml. of peroxide-free dioxane containing a 10% molar excess of sulfuric acid as a 1 N solution, there was added in the dark at 40° C. a 10% molar excess of N-bromosuccinimide. The mixture was maintained at 40° C. for 1 hour and the product isolated as described in the previous example.

EXAMPLE LXXXVI

*9α-Bromo-21-Methyl-$\Delta^{1,4}$-Pregnadiene-11β,17α,21-Triol-3,20-Dione 21-Acetate*

To a suspension of 1 gram of 21-methyl-$\Delta^{1,4,9(11)}$-pregnatriene-17α,21-triol-3,20-dione 21-acetate in 50 ml. of peroxide-free dioxane containing a 50% molar excess of p-toluene sulfonic acid in 1 N aqueous solution, there was added in the dark with stirring at 25° C., a 50% molar excess of N-bromoacetamide. The mixture was maintained at this temperature for 4 hours and the product recovered as described in Example LXXXIV.

EXAMPLE LXXXVII

*9α-Bromo-21-Methyl-$\Delta^4$-Pregnene-11β,17α,21-Triol-3,20-Dione 21-Acetate*

To a suspension of 1 gram of 21-methyl-$\Delta^{4,9(11)}$-pregnadiene-17α,21-diol-3,20-dione 21-acetate in 50 ml. of peroxide-free dioxane containing a 50% molar excess of trichloro acetic acid in 1 N aqueous solution, there was added in the dark with stirring at 25° C., a 50% molar excess of N-bromoacetamide. The mixture was maintained at this temperature for 4 hours and the product recovered as described in Example LXXXIV. The free alcohol was obtained and reacetylated with acetic anhydride and pyridine under the usual conditions.

EXAMPLE LXXXVIII

*6α-Fluoro-9α-Bromo-21-Methyl-$\Delta^{1,4}$-Pregnadiene-11β,17α,21-Triol-3,20-Dione 21-Acetate*

To a suspension of 500 mg. of 6α-fluoro-21-methyl-$\Delta^{1,4,9(11)}$-pregnatriene - 17α,21-diol-3,20-dione 21-acetate in 25 ml. of peroxide-free dioxane and 0.4 ml. of 0.46 N perchloric acid, there was added in the dark at 25° C. with stirring over a one-hour period, 114 mg. of solid N-bromoacetamide. At the end of one hour, all of the starting material had dissolved and 2.5 ml. of disodium sulfite solution was added with stirring. A few grams of ice in 20 ml. of chloroform was added and the layers separated. The organic layer was washed twice with water while maintaining the temperature of about 20° C. by the occasional addition of ice. The organic solution was concentrated in vacuo and acetone was added. The mixture was maintained at a temperature of about 5° C. until crystals formed and the desired product recovered as an alcohol by filtration. It was reacetylated as in Example LXXXVII.

The procedure of this example was used to prepare the formate, propionate, butyrate and valerate esters of all of the 9α-bromo compounds prepared in Examples LXXXIV and LXXXVII.

EXAMPLE LXXXIX

*6α-Fluoro-9β,11β-Oxido-21-Methyl-$\Delta^{1,4}$-Pregnadiene-17α,21-Diol-3,20-Dione 21-Acetate*

To a solution of 5 grams of 6α-fluoro-9α-bromo-21-methyl-$\Delta^{1,4}$-pregnadiene-11β,17α,21-triol-3,20-dione 21-acetate in 200 ml. of dioxane, there was added an equimolar solution of anhydrous potassium acetate in 320 ml. of absolute ethanol. The mixture was refluxed for 1 hour. After cooling in an ice bath, 400 ml. of ice water was added with stirring and the desired product precipitated as an alcohol. It was reacetylated as in the previous example.

EXAMPLE XC

*6α-Fluoro-9β,11β-Oxido-21-Methyl-$\Delta^4$-Pregnene-17α,21-Diol-3,20-Dione 21Acetate*

A total of 4 grams of 6α-fluoro-9α-bromo-21-methyl-$\Delta^4$-pregnene-11β,17α,21-triol-3,20-dione 21-acetate was taken up in 100 ml. of water and a 20% molar excess of sodium carbonate was added. The mixture was maintained at 20° C. for 24 hours. At the end of this period, the solution was extracted with methylene chloride. The organic extract was washed twice with water, dried over anhydrous sodium sulfate, filtered and the desired product obtained as an alcohol by removal of the solvent in vacuo. It was reacetylated as in the previous example.

EXAMPLE XCI

*9β,11β-Oxido-21-Methyl-$\Delta^{1,4}$-Pregnadiene-17α,21-Diol-3,20-Dione 21-Acetate*

A mixture containing 4 grams of 9α-bromo-21-methyl-$\Delta^{1,4}$-pregnadiene-11β,17α,21-triol-3,20-dione 21-acetate in 120 ml. of methanol was prepared and a 10% molar excess of sodium acetate in 200 ml. of methanol was added. The mixture was refluxed for 2 hours and the solvent removed in vacuo. The residue was taken up in chloroform. The chloroform solution was washed twice with water. It was dried over anhydrous sodium sulfate, filtered and the desired product obtained as the alcohol by evaporation of the solvent in vacuo. It was reacetylated as in the previous example.

EXAMPLE XCII

*9β,11β-Oxido-21-Methyl-$\Delta^4$-Pregnene-17α,21-Diol-3,20-Dione 21-Acetate*

A solution of 4 grams of 9α-bromo-21-methyl-$\Delta^4$-pregnene-11β,17α,21-triol-3,20-dione 21-acetate in 150 ml. of dioxane was prepared and a 10% molar excess of potassium bicarbonate in 300 ml. of ethanol was added. The mixture was refluxed for 2 hours. The solvent was removed in vacuo and the residue was taken up in ethylene chloride. It was isolated as an alcohol and reacetylated as described above.

The formate, propionate, butyrate and valerate esters of this compound and the compounds prepared in Examples LXXXIX through XCI were prepared in accordance with the procedure of this example.

EXAMPLE XCIII

*6α,9α-Difluoro-21-Methyl-Δ1,2-Pregnadiene-11β,17α,21-Triol-3,20 21-Acetate*

To a solution of 0.4 mole of anhydrous hydrogen fluoride and 0.24 mole of tetrahydrofuran in 25 ml. of chloroform chilled to 0° C., there was added a solution of 0.05 mole of 6α-fluoro-9β,11β-oxido-21-methyl-Δ1,4-pregnadiene-17α,21-diol-3,20-dione 21-acetate in 25 ml. of chloroform previously chilled to this same temperature. The mixture was maintained at 0° C. for 20 hours and then allowed to come to room temperature. To the mixture, there was added 50 ml. of 5% aqueous potassium carbonate with constant stirring. The organic layer was separated and the aqueous layer extracted twice with equal volumes of chloroform. The combined organic layers were washed with water, dried over anhydrous sodium sulfate, filtered and the solvent removed in vacuo to leave the desired product.

The foregoing procedure was repeated to form the formate, propionate, butyrate and valerate esters.

EXAMPLE XCIV

*6α,9α-Difluoro-21-Methyl-Δ4-Pregnene-11β,17α,21-Triol-3,20-Dione 21-Acetate*

To a solution of 0.2 mole of anhydrous hydrogen fluoride and 0.05 mole of tetrahydrofuran in 20 ml. of carbon tetrachloride chilled to −70° C., there was added a solution of 0.1 mole of 6α-fluoro-9β,11β-oxido-21-methyl-Δ4-pregnene-17α,21-diol-3,20-dione 21-acetate in 150 ml. of carbon tetrachloride previously chilled to this same temperature. The mixture was maintained at this temperature for 4 hours and then allowed to come to room temperature. The desired product was isolated as described above.

The foregoing procedure was repeated to form the formate, propionate, butyrate and valerate esters.

EXAMPLE XCV

*9α-Fluoro-21-Methyl-Δ1,4-Pregnadiene-11β,17α,21-Triol-3,20-Dione 21-Acetate*

To a solution of 0.4 mole of anhydrous hydrogen fluoride and 0.24 mole of dioxane in 25 ml. of octane chilled to 0° C., there was added a solution of 0.05 mole of 9β,11β-oxido-21-methyl-Δ1,4-pregnadiene-17α,21-diol-3,20-dione 21-acetate in 30 ml. of the same solvent previously chilled to 0° C. The mixture was maintained at this temperature for 16 hours and then allowed to come to room temperature. The product was isolated as described above.

The foregoing procedure was repeated to form the formate, propionate, butyrate and valerate esters.

EXAMPLE XCVI

*9α-Fluoro-21-Methyl-Δ4-pregnene-11β,17α,21-Triol-3,20-Dione 21-Acetate*

To a solution of 0.8 mole of anhydrous hydrogen fluoride and 0.48 mole of propanol in 50 ml. of benzene at 30° C., there was added a solution of .1 mole of 9β,11β-oxido-21-methyl-Δ4-pregnene-17α,21-diol-3,20-dione 21-acetate at this same temperature. The mixture was maintained at 30° C. for 4 hours and the product was isolated as described above.

The foregoing procedure was repeated to form the formate, propionate, butyrate and valerate esters.

EXAMPLE XCVII

*5α,6β-Dibromo-21-Methyl-Pregnane-3β,17α-Diol-20-One*

A solution containing 5 grams of 21-methyl-Δ5-pregnene-3β,17α-diol-20-one in 100 ml. of methylene chloride was treated with an equimolar portion of bromine in an additional 100 ml. of methylene chloride at 2° C. and maintained at this temperature for 30 minutes. At the end of this period, the solution was washed with 2% aqueous sodium carbonate solution and then with water. The organic layer was dried over anhydrous sodium sulfate, filtered and the desired product obtained by removal of the solvent in vacuo.

EXAMPLE XCVIII

*5α,6α-Dibromo-21-Methyl-Pregnane-17α-Ol-3,20-Dione*

To a solution of 5 grams of the compound prepared in the previous example in 25 ml. of glacial acetic acid, there was added 15 ml. of a solution of chromium trioxide in a 9:1 acetic acid-water solution containing 76 mg. of chromium trioxide per ml. of solution. The mixture was kept at room temperature during the addition and for an additional 4 hours. The desired product was precipitated by the addition of water and collected by filtration.

EXAMPLE XCIX

*21-Methyl-Δ4-Pregnene-17α-Ol-3,20-Dione*

A mixture containing 5 grams of the compound prepared in the previous example together with a 100% excess of zinc dust in 100 ml. of a 1:1 mixture of methylene chloride and methanol was refluxed for one hour. At the end of this period, 5 ml. of acetic acid was added and the mixture refluxed for an additional 45 minutes. The mixture was filtered, cooled and adjusted to a pH of 0.2 with hydrochloric acid and held at 25 to 30° C. for 45 minutes and an equal portion of water was added. The organic layer was separated, dried over anhydrous sodium sulfate, filtered and the solvent removed to yield the desired product.

EXAMPLE C

*21-Methylene-Δ5-Pregnene-3β,17α-Diol-20-One*

A total of 5 grams of 21-dimethylaminomethyl-Δ5-pregnene-3β,17α-diol-20-one hydrochloride was taken up in 100 ml. of ethanol and a 50% molar excess of ethyl bromide together with 0.6 gram of potassium acetate was added. The mixture was refluxed for 5 hours and evaporated to one-fifth volume. The desired product was precipitated by the addition of 4 volumes of water and collected by filtration.

What is claimed is:

1. A process which comprises reacting a compound having the formula:

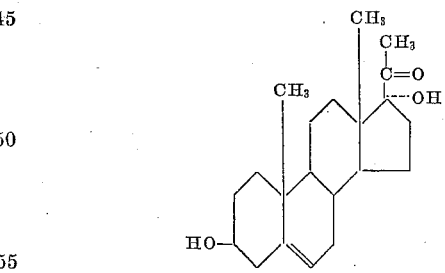

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

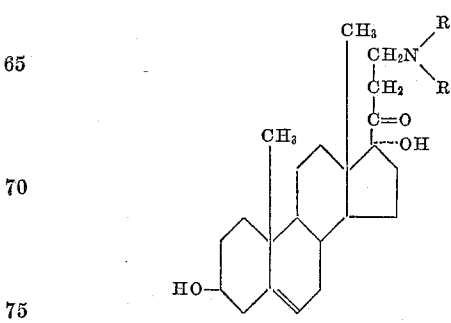

wherein $R_1$ and $R_2$ are alkyl containing up to four carbon atoms; reacting said compound with an alkyl halide in a lower alkanol solvent containing up to two carbon atoms at a temperature of from about 20° C. to about 30° C. for a period of from about 6 to about 16 hours to produce a compound having the formula:

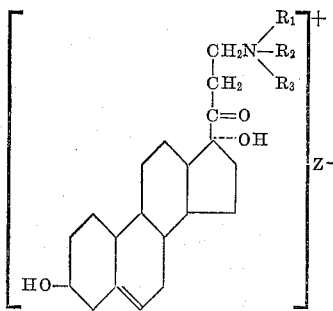

wherein $R_1$, $R_2$ and $R_3$ are alkyl containing up to four carbon atoms and Z is halogen, maintaining said compound in an aqueous solution at a pH of from about 7 to about 12 at a temperature of from about 20° C. to about 30° C. for a period of from about 1 to about 6 hours to produce a compound having the formula:

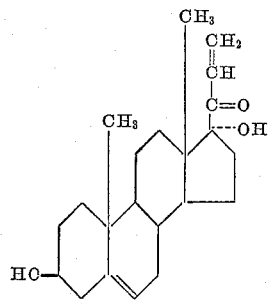

reacting said compound with hydrogen in the presence of palladium in a liquid medium at from about 15° C. to about 35° C. at a pressure of from about 1 to about 10 atmospheres to produce a compound having the formula:

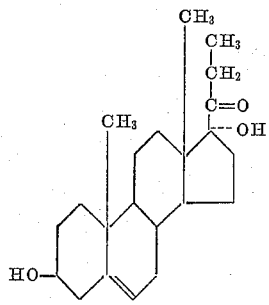

2. A process which comprises reacting a compound having the formula:

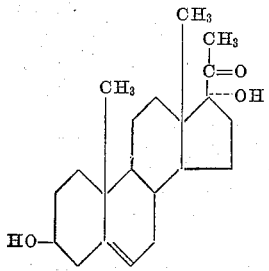

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

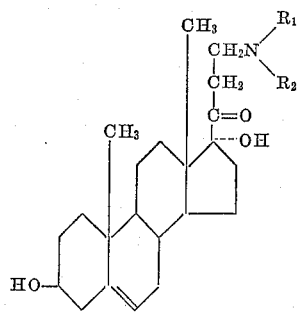

wherein $R_1$ and $R_2$ are alkyl containing up to four carbon atoms; reacting said compound with an alkyl halide in a lower alkanol solvent containing up to two carbon atoms at a temperature of from about 20° C. to about 30° C. for a period of from about 6 to about 16 hours to produce a compound having the formula:

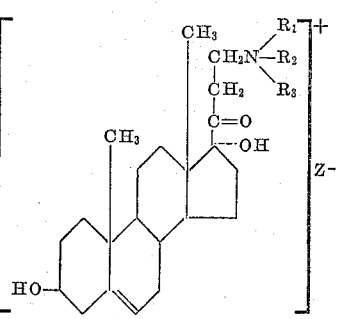

wherein $R_1$, $R_2$ and $R_3$ are alkyl containing up to four carbon atoms and Z is halogen; maintaining said compound in an aqueous solution at a pH of from about 7 to about 12 at a temperature of from about 20° C. to about 30° C. for a period of from about 1 to about 6 hours to produce a compound having the formula:

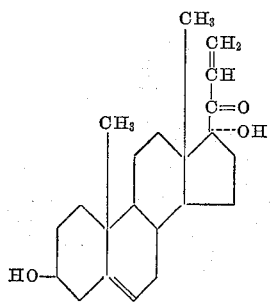

reacting said compound with hydrogen in the presence of palladium in a liquid medium at from about 15° C. to about 35° C. at a pressure of from about 1 to about 10 atmospheres to produce a compound having the formula:

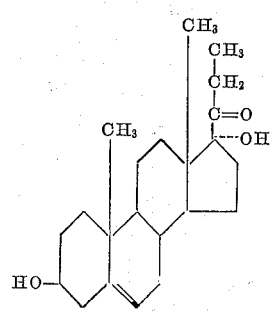

oxidizing said compound to produce a compound having the formula:

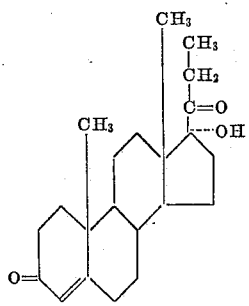

subjecting said compound to the oxygenating activity of an 11-hydroxylating microorganism to produce a compound having the formula:

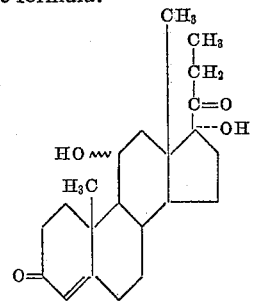

reacting said compound with from about a molar equivalent to about a 40% molar excess of a reagent selected from the group consisting of mesyl and tosyl chloride in the presence of at least sufficient nitrogenous base to neutralize by-product hydrogen chloride at a temperature of from about 0° C. to about 40° C. for a period of from about 8 to about 60 hours in a solvent selected from the group consisting of pyridine, hydrocarbon, and halogenated hydrocarbon solvents containing up to eight carbon atoms to produce a compound having the formula:

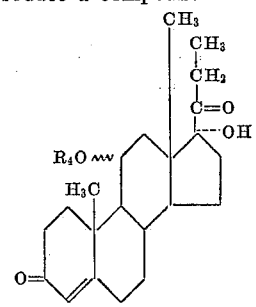

wherein $R_4$ is selected from the group consisting of mesyl and tosyl; reacting said compound with from about a molar equivalent to about a 700% molar excess of a reagent selected from the group consisting of sodium and potassium salts of fatty acids containing up to four carbon atoms in a solvent selected from the group consisting of fatty acids containing up to four carbon atoms and N-alkyl and N,N-dialkyl derivatives of these, an alkyl group containing up to two carbon atoms, at a temperature of from about 30° C. to about 140° C. for a period of from about 10 minutes to about 16 hours to produce a compound having the formula:

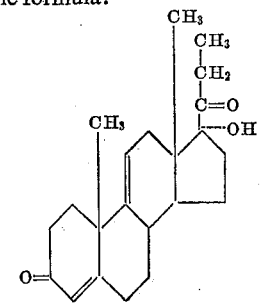

reacting said compound with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity equivalent to from 0.006 to 0.018 gram of iodine/ml. of tetrahydrofuran at a temperature of from about 20° C. to about 40° C. for a period of from about 2 to about 5 hours to produce a compound having the formula:

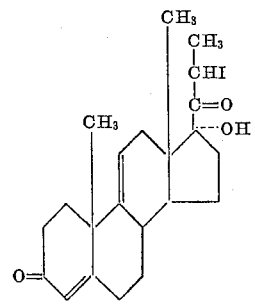

reacting said compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound having the formula:

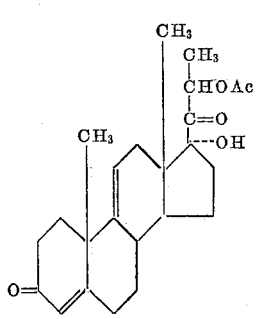

wherein Ac is an acyl hydrocarbon group containing only carbon, hydrogen and oxygen up to a total of five carbon atoms; reacting said compound in peroxide-free dioxane with from about a molar equivalent to about a 50% molar excess of hypobromous acid at a temperature of from about 20° C. to about 40° C. for a period of from about 1 to about 4 hours to produce a compound having the formula:

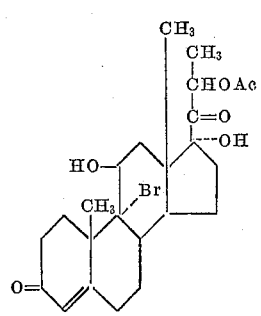

wherein Ac has the same meaning as above; reacting said compound with from about a molar equivalent to about a 200% molar excess of a reagent selected from the group consisting of sodium and potassium acetate in a solvent selected from the group consisting of dioxane, methanol and ethanol at a temperature of from about 20° C. to about 75° C. for a period of from about 1 to about 20 hours to produce a compound having the formula:

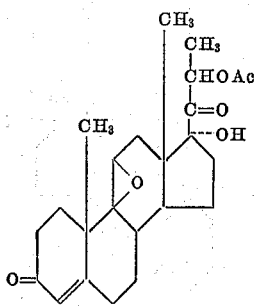

wherein Ac has the same meaning as above; reacting said compound with an excess of hydrogen fluoride for from about 4 to about 20 hours at a temperature of from about −70° C. to about 30° C. in a solvent selected from the group consisting of hydrocarbon and halogenated hydrocarbon solvents containing up to eight carbon atoms in the presence of an organic proton acceptor selected from the group consisting of methanol, ethanol, propanol, dioxane and tetrahydrofuran to produce a compound having the formula:

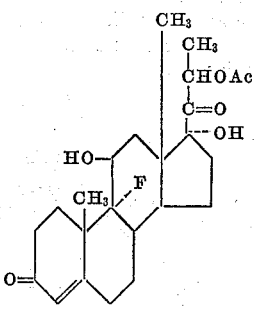

wherein Ac has the same meaning as above.

3. A process which comprises reacting a compound having the formula:

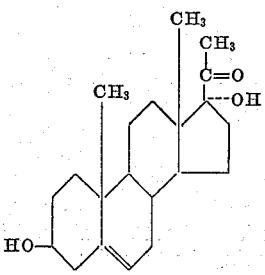

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

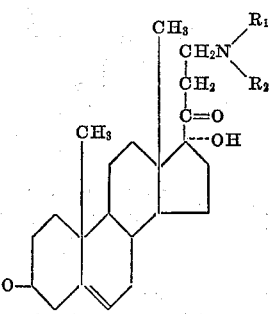

wherein $R_1$ and $R_2$ are alkyl containing up to four carbon atoms; reacting said compound with an alkyl halide in a lower alkanol solvent containing up to two carbon atoms at a temperature of from about 20° C. to about 30° C. for a period of from about 6 to about 16 hours to produce a compound having the formula:

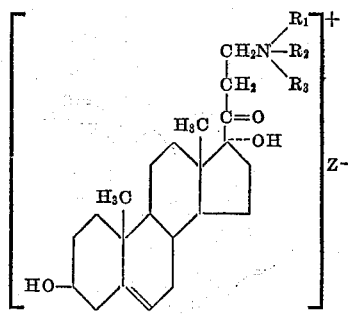

wherein $R_1$, $R_2$ and $R_3$ are alkyl containing up to four carbon atoms and Z is halogen; maintaining said compound in an aqueous solution at a pH of from about 7 to about 12 at a temperature of from about 20° C. to about 30° C. for a period of from about 1 to about 6 hours to produce a compound having the formula:

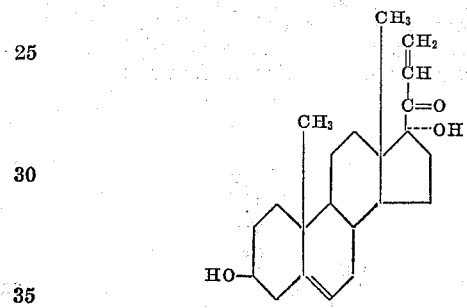

reacting said compound with hydrogen in the presence of palladium in a liquid medium at from about 15° C. to about 35° C. at a pressure of from about 1 to about 10 atmospheres to produce a compound having the formula:

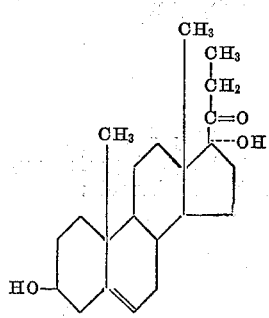

reacting said compound with from about 1.05 to about 1.15 molar equivalents of N-bromoacetamide and from about 25 to about 100 molar equivalents of anhydrous hydrogen fluoride in a solvent system consisting of tetrahydrofuran and methylene chloride containing from about 20% to about 40% tetrahydrofuran by volume at a temperature of from about −80° C. to about −50° C. for a period of from about 1 to about 16 hours to produce a compound having the formula:

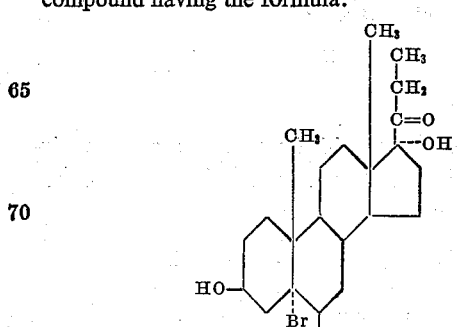

oxidizing said compound to produce a compound having the formula:

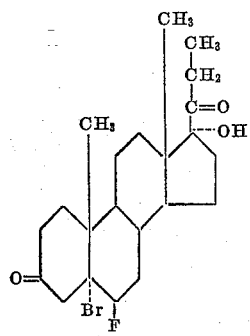

reacting said compound with from about a molar equivalent to about a 200% molar excess of an alkaline reagent in a solvent selected from the group consisting of alkanols, esters and ketones containing up to nine carbon atoms at a temperature of from about 50° C. to about 130° C. for a period of from about one-half to about one hour to produce a compound having the formula:

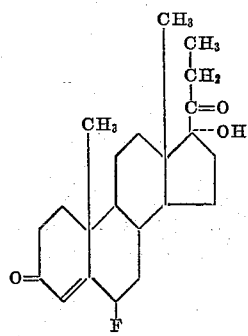

subjecting the resulting compound to the oxygenating activity of an 11-hydroxylating microorganism to produce a compound having the formula:

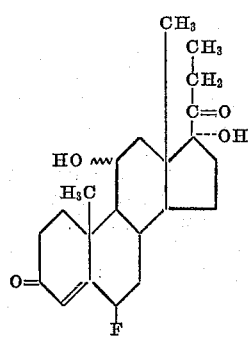

reacting said compound with from about a molar equivalent to about a 40% molar excess of a reagent selected from the group consisting of mesyl and tosyl chloride in the presence of at least sufficient nitrogenous base to neutralize by-product hydrogen chloride at a temperature of from about 0° C. to about 40° C. for a period of from about 8 to about 60 hours in a solvent selected from the group consisting of pyridine, hydrocarbon and halogenated hydrocarbon solvents containing up to eight carbon atoms to produce a compound having the formula:

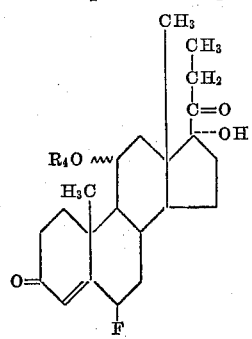

wherein $R_4$ is selected from the group consisting of mesyl and tosyl; reacting said compound with from about a molar equivalent to about a 700% molar excess of a reagent selected from the group consisting of sodium and potassium salts of fatty acids containing up to four carbon atoms in a solvent selected from the group consisting of fatty acids containing up to four carbon atoms in N-alkyl and N,N-dialkyl derivatives of these, an alkyl group containing up to two carbon atoms at a temperature of from about 30° C. to about 140° C. for a period of from about 10 minutes to about 16 hours to produce a compound having the formula:

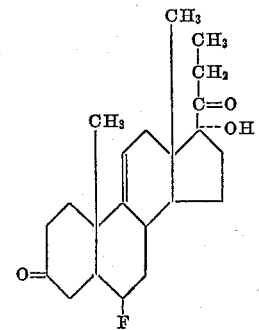

reacting said compound with a reagent selected from the group consisting of anhydrous hydrogen chloride and anhydrous hydrogen bromide in a solvent selected from the group consisting of halogenated hydrocarbons containing up to two carbon atoms and aliphatic esters and alkanols containing up to three carbon atoms and mixtures of these at a temperature of from about −5° C. to about 10° C. for a period of from about 2 to about 4 hours to produce a compound having the formula:

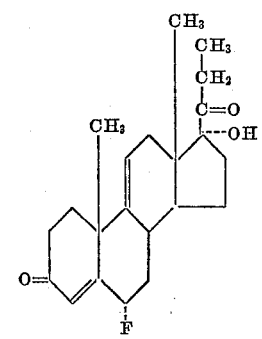

reacting said compound with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity of from 0.006 to 0.018 gram of iodine/ml. of tetrahydrofuran at a temperature of from about 20° C. to about 40° C. for a period of from about 2 to about 5 hours to produce a compound having the formula:

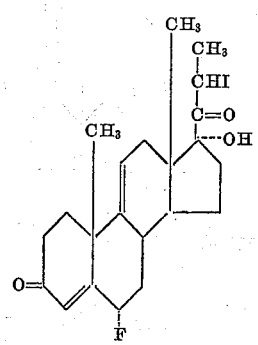

reacting said compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound having the formula:

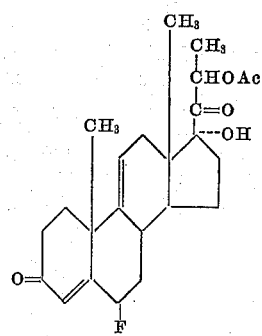

wherein Ac is an acyl hydrocarbon group containing only carbon, hydrogen and oxygen up to a total of five carbon atoms; reacting said compound in peroxide-free dioxane with from about a molar equivalent to about a 50% molar excess of hypobromous acid at a temperature of from about 20° C. to about 40° C. for a period of from about 1 to about 4 hours to produce a compound having the formula:

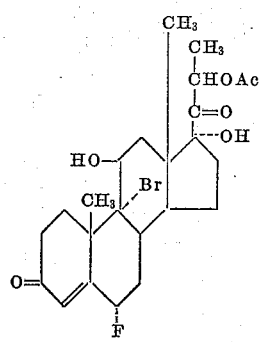

wherein Ac has the same meaning as above; reacting said compound with from about a molar equivalent to about a 200% molar excess of a reagent selected from the group consisting of sodium and potassium acetate in a solvent selected from the group consisting of dioxane, methanol and ethanol at a temperature of from about 20° C. to about 75° C. for a period of from about 1 to about 20 hours to produce a compound having the formula:

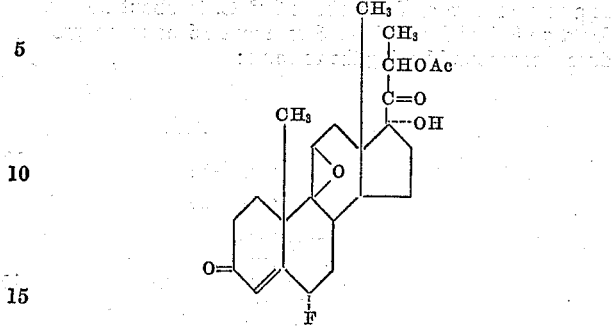

wherein Ac has the same meaning as above; reacting said compound with an excess of hydrogen fluoride for from about 4 to about 20 hours at a temperature of from about −70° C. to about 30° C. in a solvent selected from the group consisting of hydrocarbon and halogenated hydrocarbon solvents containing up to eight carbon atoms in the presence of an organic proton acceptor selected from the group consisting of methanol, ethanol, propanol, dioxane and tetrahydrofuran to produce a compound having the formula:

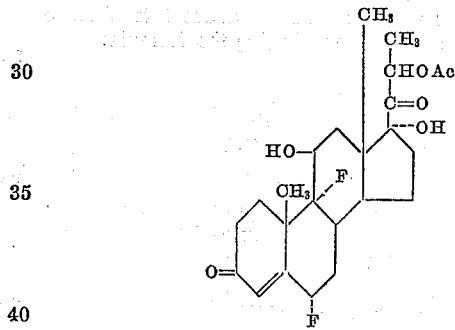

wherein Ac has the same meaning as above.

4. A process which comprises reacting a compound having the formula:

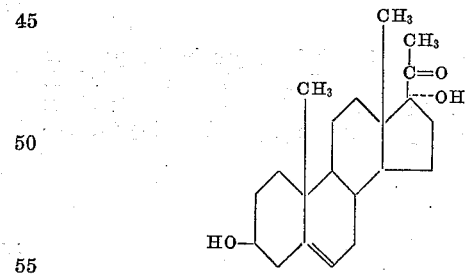

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

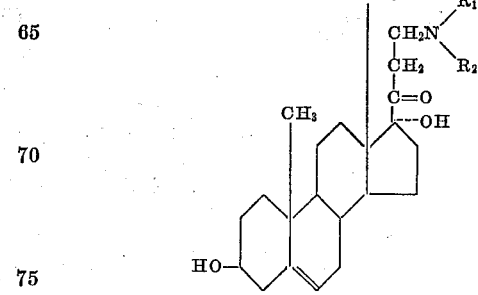

wherein $R_1$ and $R_2$ are alkyl containing up to four carbon atoms; reacting said compound with an alkyl halide in a lower alkanol solvent containing up to two carbon atoms at a temperature of from about 20° C. to about 30° C. for a period of from about 6 to about 16 hours to produce a compound having the formula:

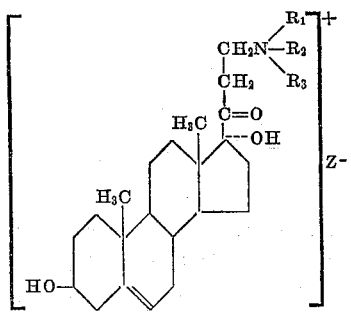

wherein $R_1$, $R_2$ and $R_3$ are alkyl containing up to four carbon atoms and Z is halogen; maintaining said compound in an aqueous solution at a pH of from about 7 to about 12 at a temperature of from about 20° C. to about 30° C. for a period of from about 1 to about 6 hours to produce a compound having the formula:

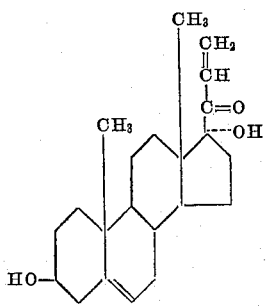

reacting said compound with hydrogen in the presence of palladium in a liquid medium of from about 15° C. to about 35° C. at a pressure of from about 1 to about 10 atmospheres to produce a compound having the formula:

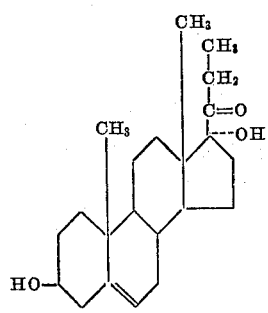

reacting said compound with from about 1.05 to about 1.15 molar equivalents of N-bromoacetamide and from about 25 to about 100 molar equivalents of anhydrous hydrogen fluoride in a solvent system consisting of tetrahydrofuran and methylene chloride containing from about 20% to about 40% tetrahydrofuran by volume at a temperature of from about −80° C. to about −50° C. for a period of from about 1 to about 16 hours to produce a compound having the formula:

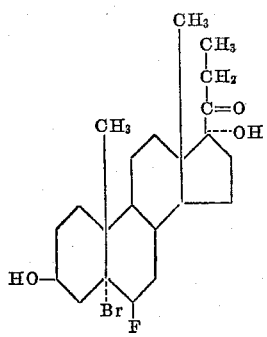

oxidizing said compound to produce a compound having the formula:

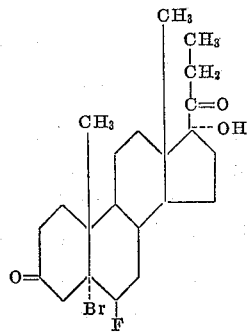

reacting said compound with from about a molar equivalent to about a 200% molar excess of an alkaline reagent in a solvent selected from the group consisting of alkanols, esters and ketones containing up to nine carbon atoms at a temperature of from about 50° C. to about 130° C. for a period of from about one-half to about one hour to produce a compound having the formula:

subjecting the resulting compound to the oxygenating activity of an 11-hydroxylating microorganism to produce a compound having the formula:

reacting said compound with from about a molar equivalent to about a 40% molar excess of a reagent selected from the group consisting of mesyl and tosyl chloride in the presence of at least sufficient nitrogenous base to neutralize by-product hydrogen chloride at a temperature of from about 0° C. to about 40° C. for a period of from about 8 to about 60 hours in a solvent selected from the group consisting of pyridine, hydrocarbon and halogenated hydrocarbon solvents containing up to eight carbon atoms to produce a compound having the formula:

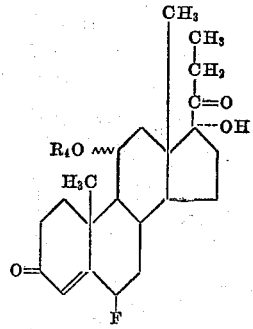

wherein $R_4$ is selected from the group consisting of mesyl and tosyl; reacting said compound with from about a molar equivalent to about a 700% molar excess of a reagent selected from the group consisting of sodium and potassium salts of fatty acids containing up to four carbon atoms in a solvent selected from the group consisting of fatty acids containing up to four carbon atoms in N-alkyl and N,N'-dialkyl derivatives of these, an alkyl group containing up to two carbon atoms at a temperature of from about 30° C. to about 140° C. for a period of from about 10 minutes to about 16 hours to produce a compound having the formula:

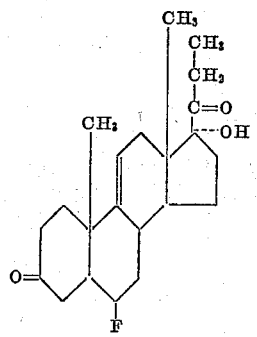

reacting said compound with a reagent selected from the group consisting of anhydrous hydrogen chloride and anhydrous hydrogen bromide in a solvent selected from the group consisting of halogenated hydrocarbons containing up to two carbon atoms and aliphatic esters and alkanols containing up to three carbon atoms and mixtures of these at a temperature of from about —5° C. to about 10° C. for a period of from about 2 to about 4 hours to produce a compound having the formula:

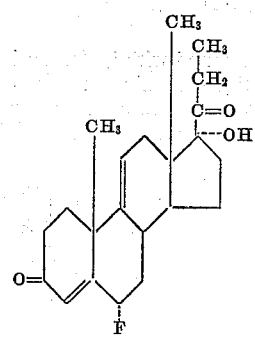

dehydrogenating the said compound with a dehydrogenating agent selected from the group consisting of the dehydrogenating activity of a microorganism and from about 1 to about 10 molar equivalents of selenium dioxide in a reaction inert organic solvent at a temperature of from about 75° C. to about 200° C. for a period of from about 1 to about 100 hours to produce a compound having the formula:

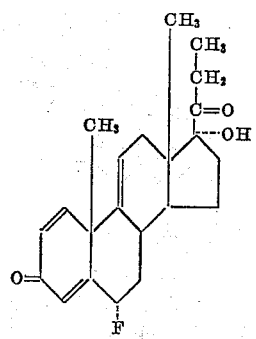

reacting said compound with from 4 to 6 molar equivalents of calcium oxide and 1.5 to 2 molar equivalents of iodine in a solvent system consisting of 2 volumes of tetrahydrofuran and 1 volume of a lower alkanol containing up to four carbon atoms, the said solvent system containing tertiary butyl hydroperoxide in a quantity equivalent to 0.006 to 0.018 gram of iodine/ml. of tetrahydrofuran at a temperature of from about 20° C. to about 40° C. for a period of from about 2 to about 5 hours to produce a compound having the formula:

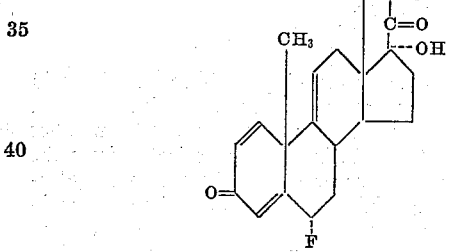

reacting said compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones, containing up to five carbon atoms at a temperature of from about 40° C. to about 100° C. for a period of from about 4 to about 24 hours to produce a compound having the formula:

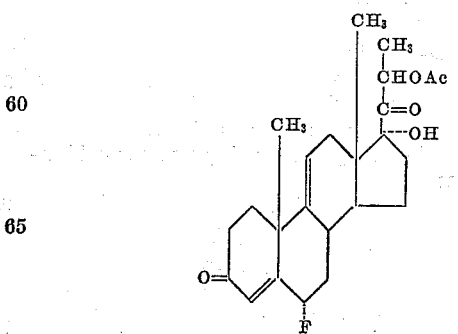

wherein Ac is an acyl hydrocarbon group containing only carbon, hydrogen and oxygen up to a total of five carbon atoms; reacting said compound in peroxide-free dioxane with from about a molar equivalent to about a 50% excess of hypobromous acid at a temperature of from about 20° C. to about 40° C. for a period of from about 1 to about 4 hours to produce a compound having the formula:

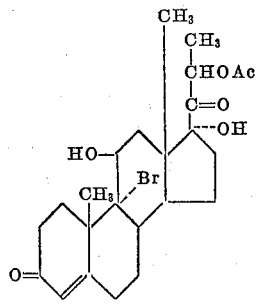

wherein Ac has the same meaning as above; reacting said compound with from about a molar equivalent to about a 200% excess of a reagent selected from the group consisting of sodium and potassium acetate in a solvent selected from the group consisting of dioxane, methanol and ethanol at a temperature of from about 20° C. to about 75° C. for a period of from about 1 to about 20 hours to produce a compound having the formula:

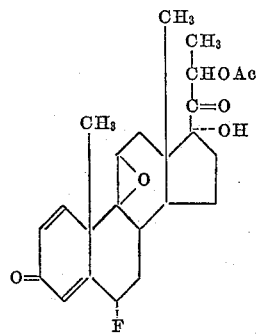

wherein Ac has the same meaning as above; reacting said compound with an excess of hydrogen fluoride for from about 4 to about 20 hours at a temperature of from about −70° C. to about 30° C. in a solvent selected from the group consisting of hydrocarbon and halogenated hydrocarbon solvents containing up to eight carbon atoms in the presence of an organic proton acceptor selected from the group consisting of methanol, ethanol, propanol, dioxane and tetrahydrofuran to produce a compound having the formula:

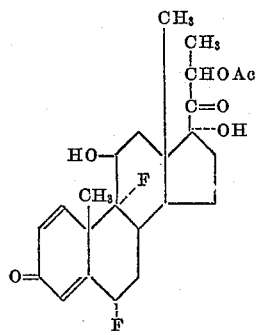

wherein Ac has the same meaning as above.

5. A process which comprises reacting a compound having the formula:

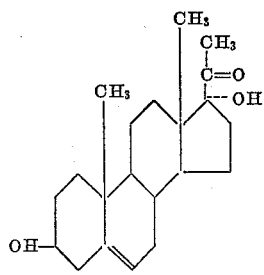

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

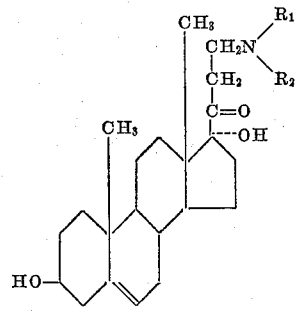

wherein $R_1$ and $R_2$ are alkyl containing up to four carbon atoms; reacting said compound with an alkyl halide in a lower alkanol solvent containing up to two carbon atoms at a temperature of from about 20° C. to about 30° C. for a period of from about 6 to about 16 hours to produce a compound having the formula:

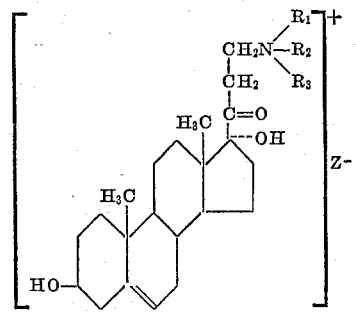

wherein $R_1$, $R_2$ and $R_3$ are alkyl containing up to four carbon atoms and Z is halogen; maintaining said compound in an aqueous solution at a pH of from about 7 to about 12 at a temperature of from about 20° C. to about 30° C. for a period of from about 1 to about 6 hours to produce a compound having the formula:

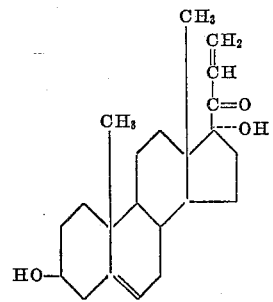

reacting said compound with hydrogen in the presence of palladium in a liquid medium at from about 15° C. to about 35° C. at a pressure of from about 1 to about 10 atmospheres to produce a compound having the formula:

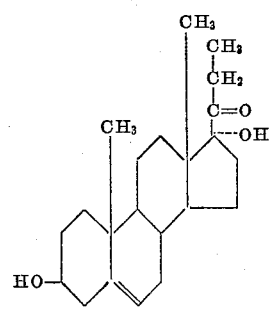

oxidizing the said compound to produce a compound having the formula:

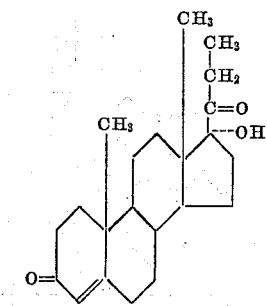

subjecting resulting compound to the oxygenating activity of an 11-hydroxylating microorganism to produce a compound having the formula:

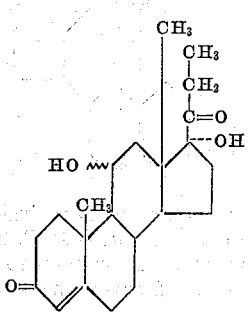

reacting said compound with from about a molar equivalent to about a 40% molar excess of a reagent selected from the group consisting of mesyl and tosyl chloride in the presence of at least sufficient nitrogenous base to neutralize by-product hydrogen chloride at a temperature of from about 0° C. to about 40° C. for a period of from about 8 to about 60 hours in a solvent selected from the group consisting of pyridine, hydrocarbon and halogenated hydrocarbon solvents containing up to eight carbon atoms to produce a compound having the formula:

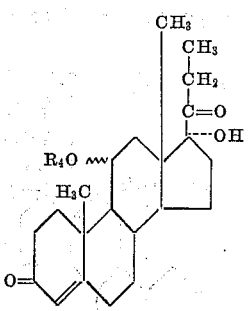

wherein $R_4$ is selected from the group consisting of mesyl and tosyl; reacting said compound with from about a molar equivalent to about a 700% molar excess of a reagent selected from the group consisting of sodium and potassium salts of fatty acids containing up to four carbon atoms in a solvent selected from the group consisting of fatty acids containing up to four carbon atoms and N-alkyl and N,N-dialkyl derivatives of these, an alkyl group containing up to two carbon atoms at a temperature of from about 30° C. to about 140° C. for a period of from about 10 minutes to about 16 hours to produce a compound having the formula:

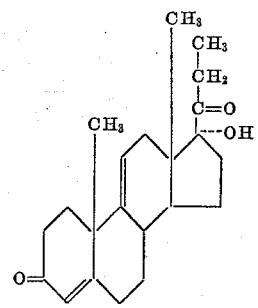

dehydrogenating said compound with a dehydrogenating agent selected from the group consisting of the dehydrogenating activity of a microorganism and from about 1 to about 10 molar equivalents of selenium dioxide in a reaction inert organic solvent at a temperature of from about 75° C. to about 200° C. for a period of from about 1 to about 100 hours to produce a compound having the formula:

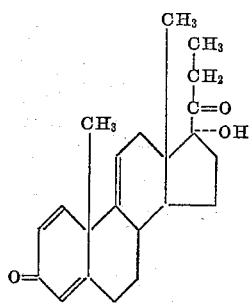

reacting said compound with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity equivalent to from 0.006 to 0.018 gram of iodine/ml. of tetrahydrofuran at a temperature of from about 20° C. to about 40° C. for a period of from about 2 to about 5 hours to produce a compound having the formula:

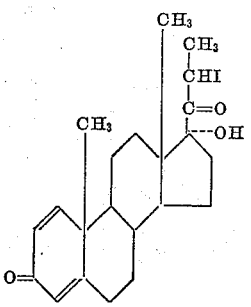

reacting said compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound having the formula:

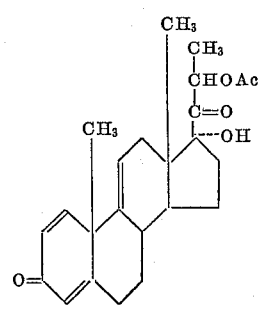

wherein Ac is an acyl hydrocarbon group containing only carbon, hydrogen and oxygen up to a total of five carbon atoms; reacting said compound in peroxide-free dioxane with from about a molar equivalent to about a 50% molar excess of hypobromous acid at a temperature of from about 20° C. to about 40° C. for a period of from about 1 to about 4 hours to produce a compound having the formula:

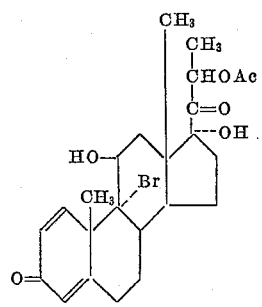

wherein Ac has the same meaning as above; reacting said compound with from about a molar equivalent to about a 200% molar excess of a reagent selected from the group consisting of sodium and potassium acetate in a solvent selected from the group consisting of dioxane, methanol and ethanol at a temperature of from about 20° C. to about 75° C. for a period of from about 1 to about 20 hours to produce a compound having the formula:

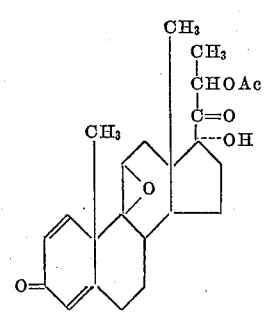

wherein Ac has the same meaning as above; reacting said compound with an excess of hydrogen fluoride for from about 4 to about 20 hours at a temperature of from about —70° C. to about 30° C. in a solvent selected from the group consisting of hydrocarbon and halogenated hydrocarbon solvents containing up to eight carbon atoms in the presence of an organic proton acceptor selected from the group consisting of methanol, ethanol, propanol, dioxane and tetrahydrofuran to produce a compound having the formula:

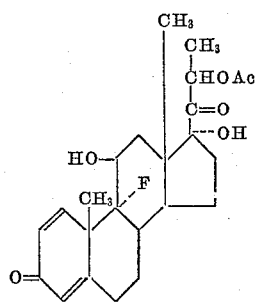

wherein Ac has the same meaning as above.

6. A process as in claim 5 in which a compound having the formula:

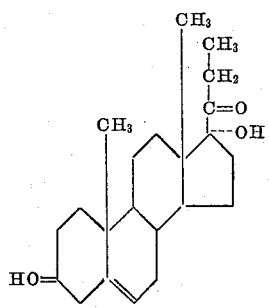

is reacted with at least a molar equivalent of bromine at a temperature of from about —5° C. to about 5° C. for a period of from about 20 minutes to about 60 minutes to produce a compound having the formula:

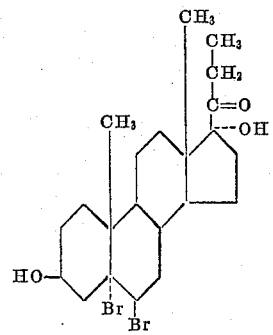

oxidizing said compound to produce a compound having the formula:

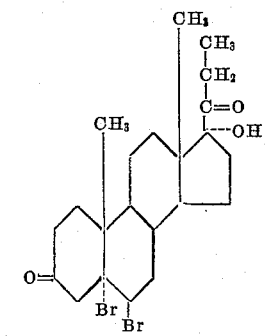

and reacting said compound with from about a 100% excess to about a 200% excess of zinc dust in a lower alkanol solvent at a temperature of from about 35° C. to about 80° C. for from about one to about two hours, removing solid precipitate, adding mineral acid to a pH of from about 0.2 to about 1.2 and maintaining resulting mixture at a temperature of from about 20° C. to about 30° C. for a period of from about 30 to about 60 minutes to produce a compound having the formula:

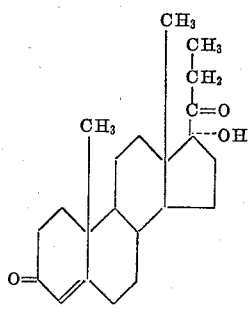

7. 21-methylene-Δ⁵-pregnene-3β,17α-diol-20-one.
8. 6β - fluoro - 21 - methyl-Δ⁴,⁹⁽¹¹⁾-pregnadiene-17α-ol-3,20-dione.
9. 21-methyl-Δ¹,⁴,⁹⁽¹¹⁾-pregnatriene-17α-ol-3,20-dione.
10. A compound selected from the group consisting of 21 - dialkylaminomethyl - Δ⁵-pregnene-3β,17α-diol-20-one and its quaternary ammonium alkyl halide derivatives, each of said alkyl groups containing up to four carbon atoms.
11. Compounds having the formula

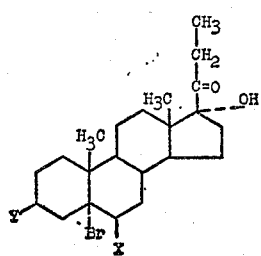

wherein X is selected from the group consisting of bromine and fluorine and Y is selected from the group consisting of keto and β-hydroxy.
12. A compound selected from the group consisting of 21-iodo-21-methyl-Δ⁴,⁹⁽¹¹⁾-pregnadiene-17α-ol-3,20-dione, and 6α-fluoro-21-iodo-21 - methyl - Δ⁴,⁹⁽¹¹⁾ - pregnadiene-17α-ol-3,20-dione and the corresponding 1,2-dehydro compounds.
13. A compound selected from the group consisting of 21 - dialkylaminomethyl - Δ¹,⁴,⁹⁽¹¹⁾ - pregnatriene-17α-ol-3,20-dione, 6α-fluoro-21 - dialkylaminomethyl - Δ¹,⁴,⁹⁽¹¹⁾-pregnatriene-17α-ol-3,20-dione, and their quaternary ammonium alkyl halide derivatives, each of said alkyl groups containing up to four carbon atoms.

14. A compound selected from the group consisting of 21 - dialkylaminomethyl-Δ⁴,⁹⁽¹¹⁾-pregnadiene-17α-ol-3,20-dione, 6α-fluoro-21-dialkylaminomethyl-Δ⁴,⁹⁽¹¹⁾ - pregnadiene-17α-ol-3,20-dione, and their quaternary ammonium alkyl halide derivatives, each of said alkyl groups containing up to four carbon atoms.
15. A compound selected from the group consisting of 6α-fluoro-21-methylene-Δ¹,⁴,⁹⁽¹¹⁾-pregnatriene-17α-ol-3,20-dione and 6β-fluoro-21-methylene-Δ¹,⁴,⁹⁽¹¹⁾-pregnatriene-17α-ol-3,20-dione.
16. 5α - bromo - 6β-fluoro-21-methyl-pregnane-3β,17α-diol-20-one.
17. 5α - bromo - 6β-fluoro-21-methyl-pregnane-17α-ol-3,20-dione.
18. A compound selected from the group consisting of those having the formula:

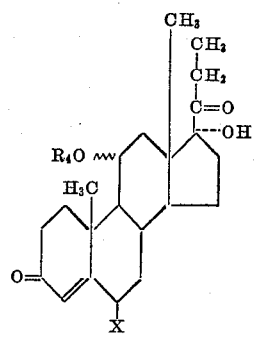

wherein X is selected from the group consisting of hydrogen and fluorine and R₄ is selected from the group consisting of mesyl and tosyl.
19. 5α,6β - dibromo - 21-methyl-pregnane-3β,17α-diol-20-one.
20. 5α,6β - dibromo - 21-methyl-pregnane-17α-ol-3,20-dione.

References Cited in the file of this patent

UNITED STATES PATENTS

| | | |
|---|---|---|
| 2,333,202 | Ruzicka et al. | Nov. 2, 1943 |
| 2,365,292 | Ruzicka | Dec. 19, 1944 |
| 2,838,498 | Magerlein et al. | June 10, 1958 |
| 2,838,541 | Magerlein et al. | June 10, 1958 |
| 2,838,542 | Spero et al. | June 10, 1958 |
| 2,842,568 | Herz et al. | July 8, 1958 |
| 2,915,434 | Agnello et al. | Dec. 1, 1959 |